(12) United States Patent
Brazier

(10) Patent No.: US 8,251,385 B2
(45) Date of Patent: Aug. 28, 2012

(54) MULTI-PIVOT VEHICLE SUSPENSION

(76) Inventor: Glen Brazier, Karlstad, MN (US)

( * ) Notice: Subject to any disclaimer, the term of this patent is extended or adjusted under 35 U.S.C. 154(b) by 0 days.

(21) Appl. No.: 13/374,402

(22) Filed: Dec. 27, 2011

(65) Prior Publication Data

US 2012/0125701 A1    May 24, 2012

Related U.S. Application Data

(62) Division of application No. 12/070,109, filed on Feb. 15, 2008, now Pat. No. 8,083,242.

(60) Provisional application No. 60/901,438, filed on Feb. 15, 2007.

(51) Int. Cl.
| | |
|---|---|
| *B60G 21/05* | (2006.01) |
| *B60G 21/045* | (2006.01) |
| *B62D 55/108* | (2006.01) |
| *B62D 55/065* | (2006.01) |

(52) U.S. Cl. ....... 280/104; 180/9.1; 180/9.46; 180/9.58; 305/134

(58) Field of Classification Search ............ 280/5.28, 280/104, 681, 682, 687, 124.111, 124.11, 280/124.128, 124.129, 124.132; 180/9.5, 180/9.54, 9.58, 9.6, 9.21, 9.1

See application file for complete search history.

(56) References Cited

U.S. PATENT DOCUMENTS

| | | | | |
|---|---|---|---|---|
| 812,037 | A * | 2/1906 | Hanson et al. | 280/104 |
| 1,071,498 | A * | 8/1913 | Babcock | 280/104 |
| 1,437,911 | A * | 12/1922 | Rawson | 280/104 |
| 1,439,802 | A * | 12/1922 | De Miranda | 280/104 |
| 2,978,050 | A * | 4/1961 | Risk et al. | 180/9.5 |
| 3,446,303 | A * | 5/1969 | Trapp | 180/9.5 |
| 3,504,928 | A * | 4/1970 | Reimer | 280/104 |
| 3,841,424 | A * | 10/1974 | Purcell et al. | 180/9.5 |
| 4,632,194 | A * | 12/1986 | Averill et al. | 175/217 |
| 4,903,974 | A * | 2/1990 | Frink | 180/253 |
| 6,006,847 | A * | 12/1999 | Knight | 180/9.26 |
| 6,247,547 | B1 * | 6/2001 | Lemke et al. | 180/9.5 |
| 6,926,105 | B2 * | 8/2005 | Brazier | 180/9.21 |
| 2001/0033067 | A1 * | 10/2001 | Vangsgard | 280/400 |
| 2005/0087374 | A1 * | 4/2005 | Kanzler et al. | 180/9.5 |

* cited by examiner

*Primary Examiner* — Paul N Dickson
*Assistant Examiner* — Wesley Potter
(74) *Attorney, Agent, or Firm* — DL Tschida

(57) ABSTRACT

An all terrain vehicle and suspension providing frame members that pivot relative to each other and independent of supported track assemblies. Suspension frame sections pivot at supported bearings and torsion couplers. An endless track of each track assembly is trained around a framework having a drive sprocket and sets of idler wheels. The track assemblies independently pivot relative to the vehicle from a track suspension frame and supported sets of idler wheels mounted to torsion biased rocker arms that resist and bias the rocker arms and idler wheels to an equilibrium position and conformally shape the track to the terrain. Improved track drive lug surfaces are shaped to prevent track derailment. The vehicle frame and track assemblies independently rise, fall and pivot as obstacles of differing configurations and types are encountered to stabilize and maintain an operator body substantially parallel to the ground.

7 Claims, 22 Drawing Sheets

MULTI-PIVOT VEHICLE SUSPENSION

RELATED APPLICATION DATA

This is a divisional application of application Ser. No. 12/070,109 filed Feb. 15, 2008, now U.S. Pat. No. 8,083,242, which is a non-provisional application of provisional application Ser. No. 60/901,438, filed Feb. 15, 2007.

BACKGROUND OF THE INVENTION

The present invention relates to all terrain vehicles (ATV) and, in particular, to a drive train suspension for a vehicle having multiple pivot axes to permit independent longitudinal and transverse pivoting of the frame suspension and supported tracks and/or wheels.

A wide variety of all terrain vehicles have been developed for travel over off-road terrain of all types and including rocks, bog, rivers, sand, snow and ice. These vehicles typically include flexible suspensions that support floatation tires and/or tracks to produce relatively low pounds per square inch (psi) footprints to minimize incapacitating the vehicle.

Vehicles are also known wherein interconnecting members or beams of associated suspension frames are coupled together to pivot relative to each other independent of the vehicle operator compartment. As supported wheels or tracks encounter obstructions, the pivot joints allow the suspension frame to flex independent of the suspension members securing the wheels to the vehicle. A term sometimes used to describe a frame suspension of the foregoing type s is a "walking beam" suspension but which typically are believed to provide a single pivot.

The present invention was developed to provide an improved multi-pivot vehicle frame suspension that permits a support frame for several included wheels and/or tracks to independently flex and accommodate relatively severe terrains. In various vehicle constructions, the vehicle provides frame suspensions with five and eight pivot points of differing pivot constructions that independently pivot from four supported tracks. Each track assembly is independently supported to the multi-pivot suspension frame and includes a track framework that accommodates independent, torsion controlled track movement with encountered obstacles. The track assemblies are also mounted to independently pivot to accommodate front, rear, crab and 360° degrees steering at the track assemblies.

Each track assembly includes a framework having a drive portion containing a drive sprocket and an arcuate upper bearing support plate. The upper bearing support plate pivots clockwise and counter clockwise relative to an intervening slide bearing member and an arcuate lower bearing support plate. The lower bearing support plate separately supports sets of idler wheels or rollers of differing sizes from torsion biased rocker arms. A track trained around the drive sprocket and idler roller framework thereby independently flexes fore and aft to rise and fall and change shape as necessary to maintain contact with encountered obstacles.

The rocker arm assemblies are coupled to the track frame with axles fitted to collars containing elastomer shims that resist and bias axle rotation to an equilibrium position. Similar torsion couplers are used at the multi-pivot vehicle suspension frame. Alternative multi-pivot frame suspensions, track assemblies and improved internal, track drive lugs are disclosed. Critical edges of the drive lug are particularly chamfered to relieve wheel lug contact prevent the idler wheels from creeping upward along the lugs and derailing. Collectively, the vehicle frame and track assemblies independently rise and fall as obstacles of differing configurations and types are encountered, while maintaining the operator compartment substantially parallel to the ground.

SUMMARY OF THE INVENTION

It is a primary object of the invention to provide an all terrain vehicle with a pivoting suspension.

It is a further object of the invention to provide an all terrain vehicle with a frame suspension containing multiple pivot points that act independently of attached support wheels and/or track assemblies.

It is further object of the invention to provide a vehicle having multiple endless tracks suspended about independent track frameworks and which tracks are further mounted to pivot about a multi-pivot vehicle suspension frame.

It is further object of the invention to provide a vehicle suspension frame having multiple pivot points at interconnected longitudinal and/or transverse frame members that are mounted to pivot relative to each other and independent of movement at associated wheel/track suspensions.

It is further object of the invention to provide track assemblies that include a framework having a drive portion containing an upper bearing support plate that pivots clockwise and counter clockwise over a lower bearing support plate and intervening slippery bearing member.

It is further object of the invention to provide a track assembly that supports sets of idler wheels or rollers of differing sizes from torsion biased rocker arms.

It is further object of the invention to provide rocker arm assemblies coupled to a track frame with couplers containing elastomer members that resist and bias rocker arm rotation to an equilibrium position.

It is further object of the invention to provide an improved internal, track drive lug surface wherein critical edges of the drive lugs are shaped to relieve wheel lug contact to prevent upward creeping of associated idler wheels along the lugs to minimize track derailment.

The foregoing objects, advantages and distinctions of the invention are obtained in several alternative multi-pivot suspension frame assemblies and track frameworks shown at the attached figures. The alternative multi-pivot suspension frame constructions provide longitudinal and/or transverse frame members that pivot relative to each other and independent of supported track assembly suspensions. Alternative, five and eight pivot point suspension frame configurations are disclosed.

Each track assembly includes a framework having a drive portion containing a drive sprocket and upper bearing support plate that pivots clockwise and counter clockwise relative to a lower bearing support plate. The lower bearing support plate supports several sets of idler wheels or rollers of differing sizes from torsion biased rocker arms. The rocker arm assemblies are coupled to the track frame with couplers containing elastomer members that resist and bias rocker arm rotation to an equilibrium position.

An improved internal, track drive lug surface is also provided that minimizes track derailment. Critical edges of the drive lug are particularly shaped to relieve wheel to lug contact to prevent track support idler wheels from creeping upward along the lugs. Collectively, the vehicle frame and track assemblies independently rise and fall as obstacles of differing configurations and types are encountered to maintain the chassis substantially parallel to the ground.

Still other objects, advantages, distinctions, constructions and combinations of individual features of the invention will become more apparent from the following description with respect to the appended drawings. Similar components and assemblies are referred to in the various drawings with similar alphanumeric reference characters. The disclosed features of the invention can be combined in various alternative configurations. The description to the presently contemplated combinations should therefore not be literally construed in limitation of the invention. Rather, the invention should be interpreted within the broad scope of the further appended claims.

BRIEF DESCRIPTION OF THE DRAWINGS

The following figures disclose presently preferred constructions of the invention. Similar components and assemblies are referred to in the various drawings with similar alphanumeric reference characters and callouts.

DESCRIPTION OF THE PREFERRED EMBODIMENT

Figure 1:
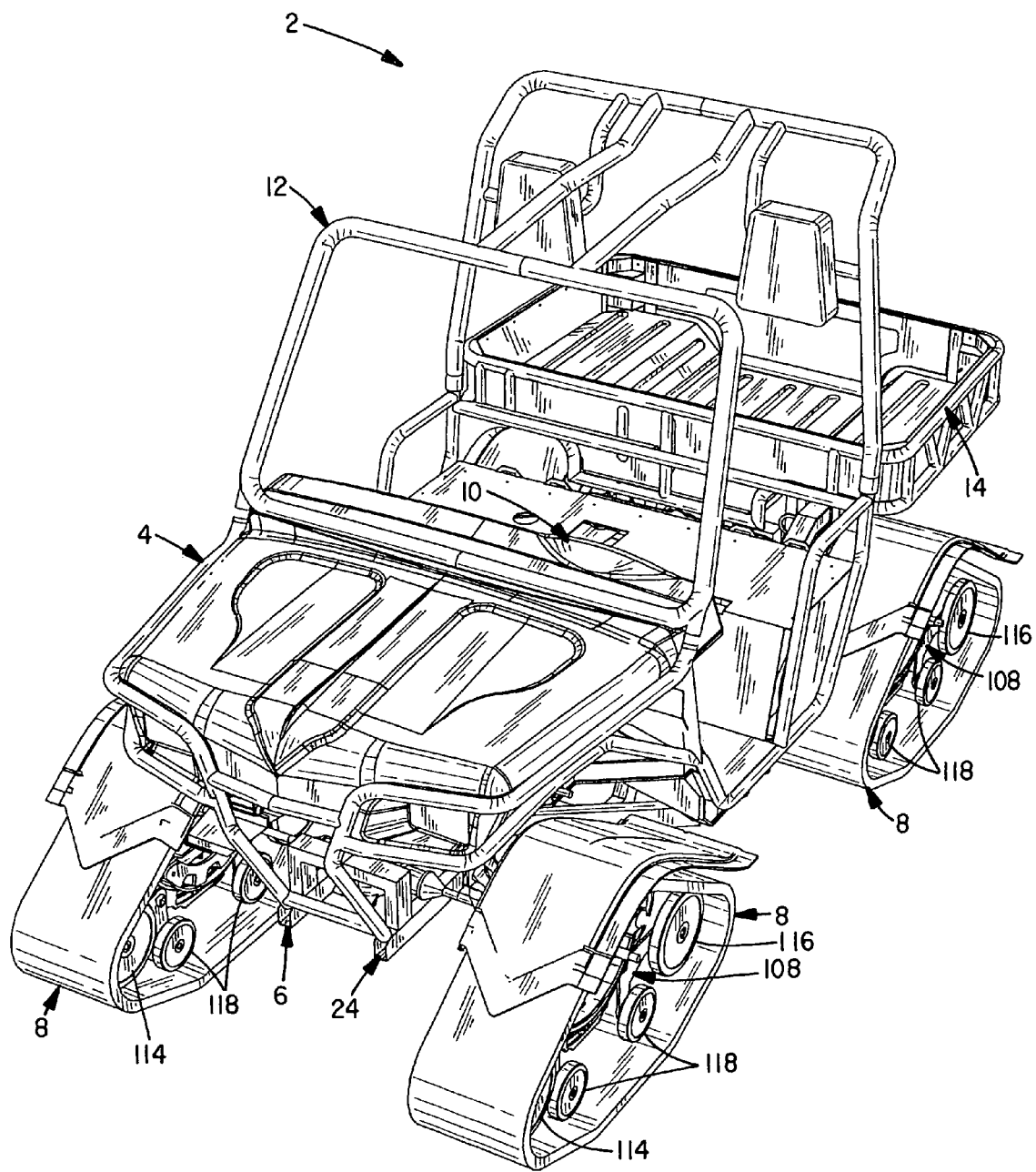
FIG. 1 is a perspective drawing showing the multi-pivot suspension of the invention mounted to a surrounding chassis.
Figure 2:
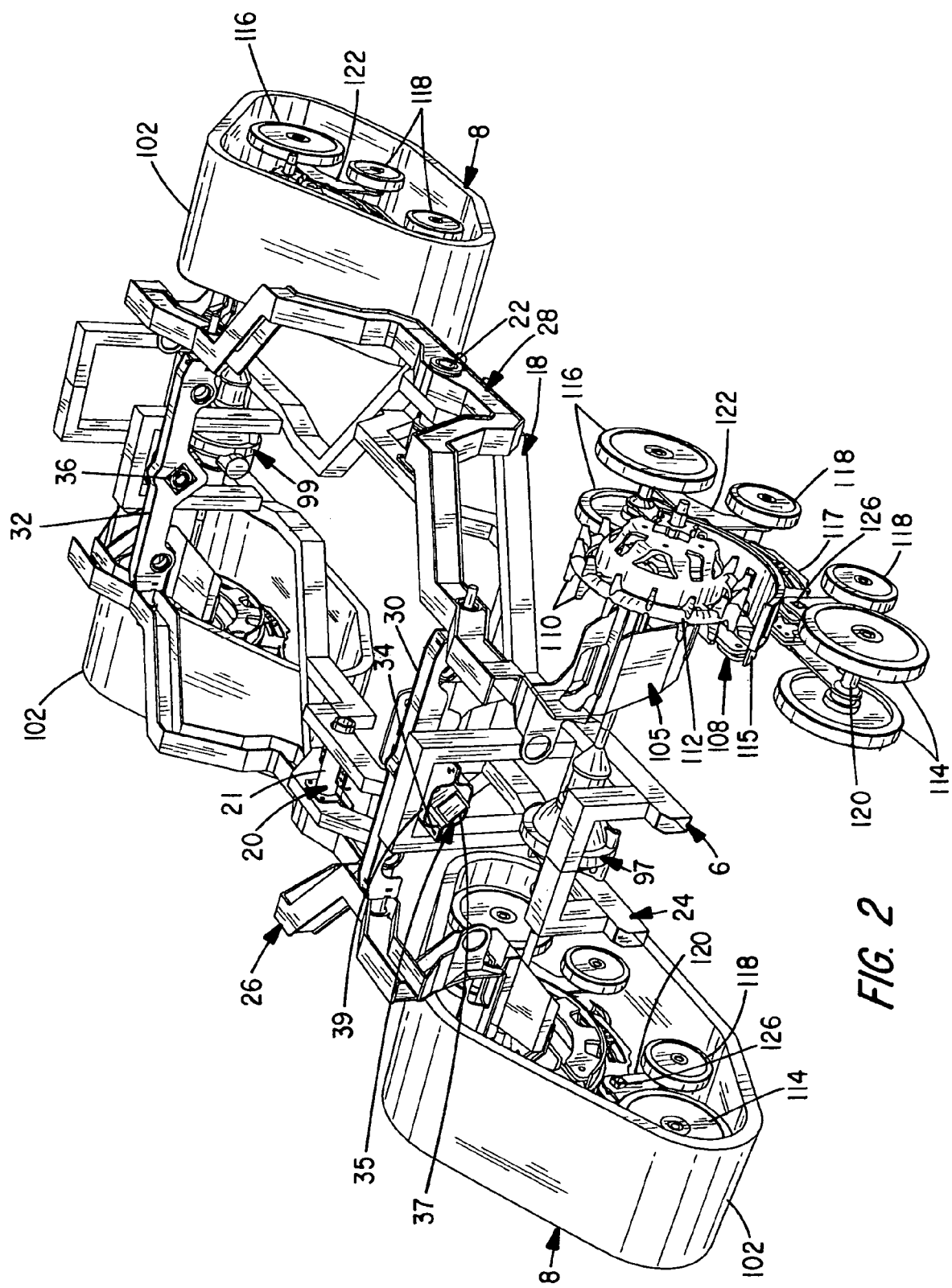
FIG. 2 is a perspective, partial section drawing showing the multi-pivot suspension of the invention removed from a surrounding chassis and depicting a drive track assembly in partial section.
Figure 3:
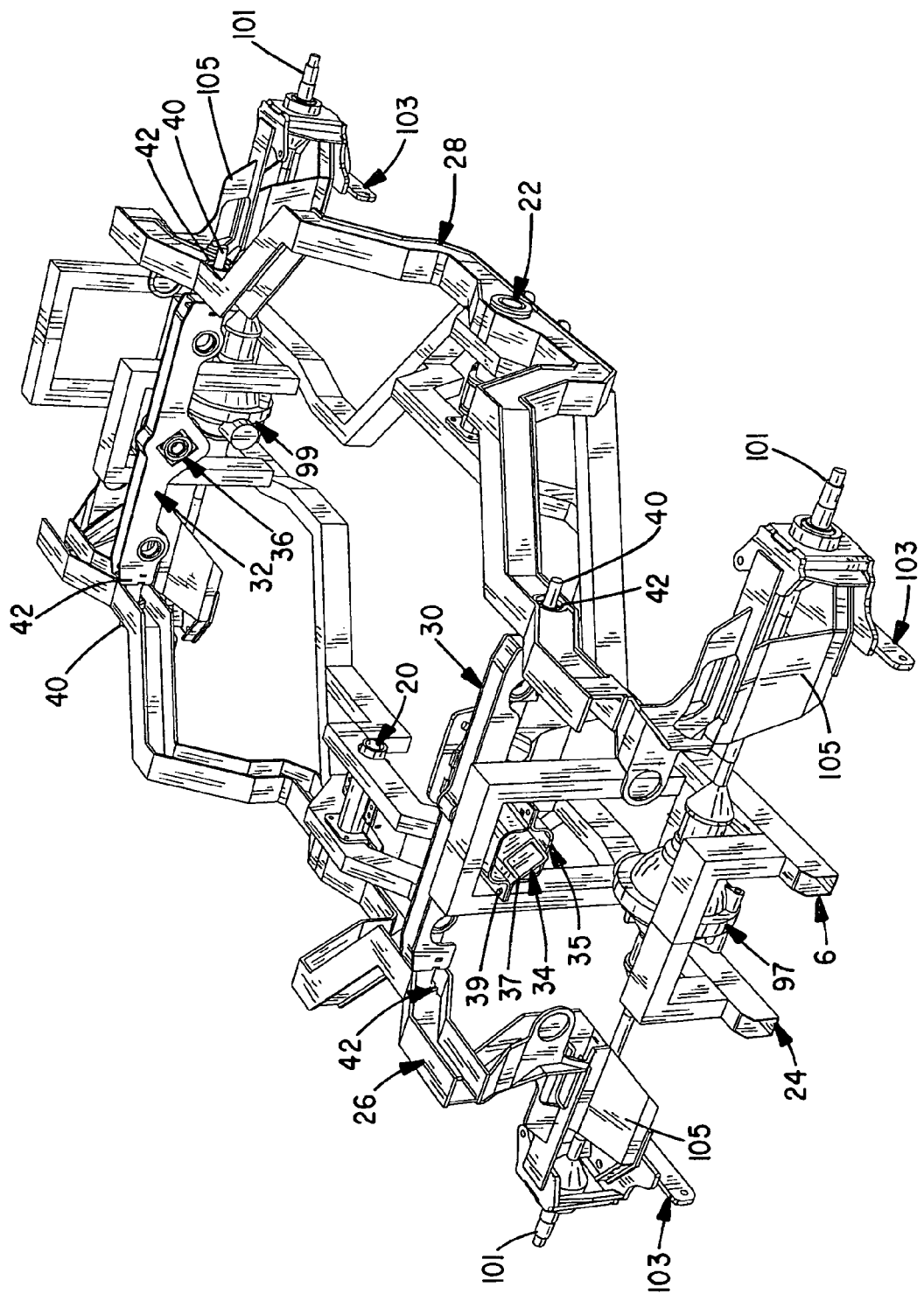
FIG. 3 is a perspective drawing showing the multi-pivot suspension of the invention and drive differentials.
Figure 4:
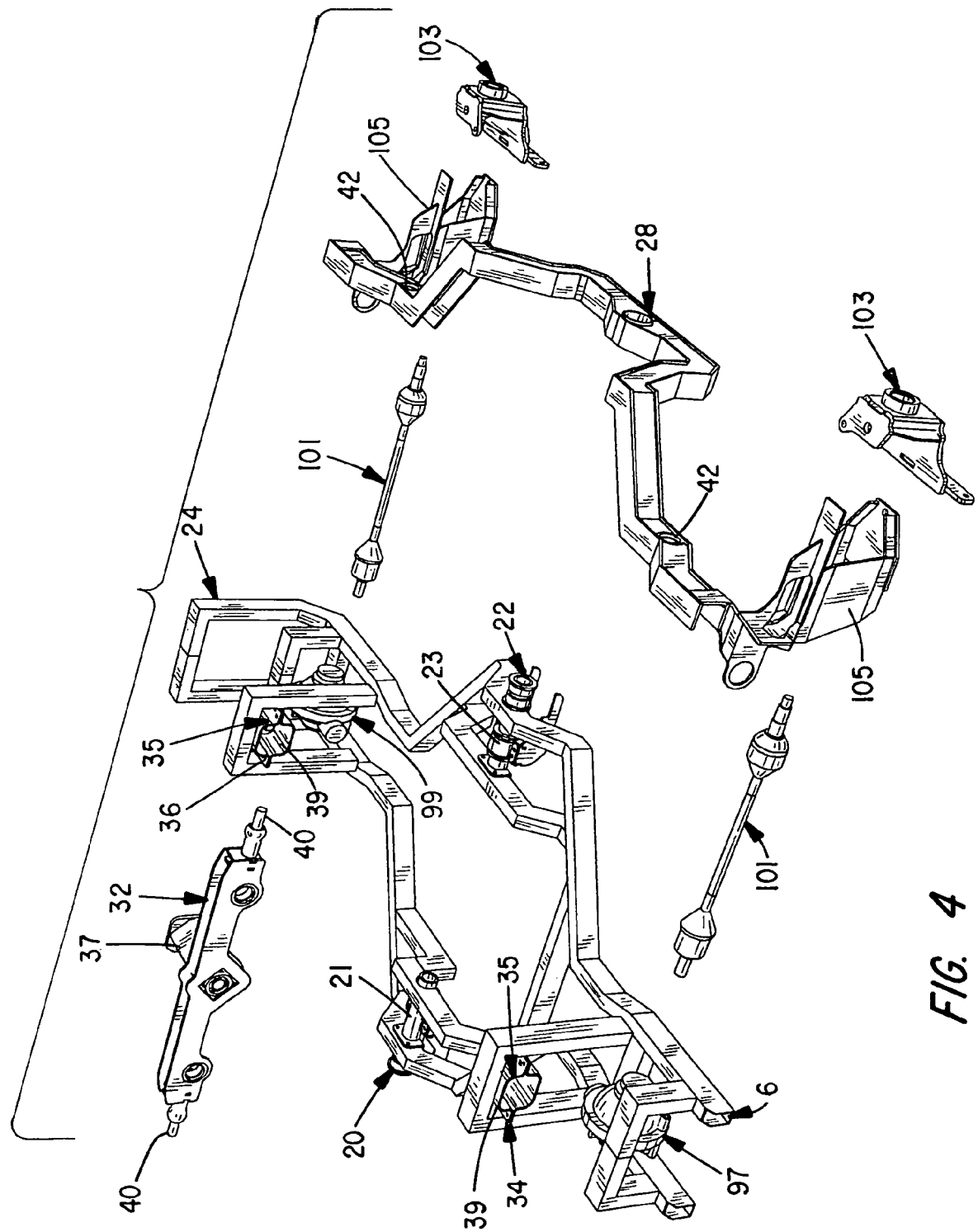
FIG. 4 is a perspective drawing showing an exploded assembly of the right side of the framework and drive train members of the multi-pivot suspension of the invention.
Figure 5:
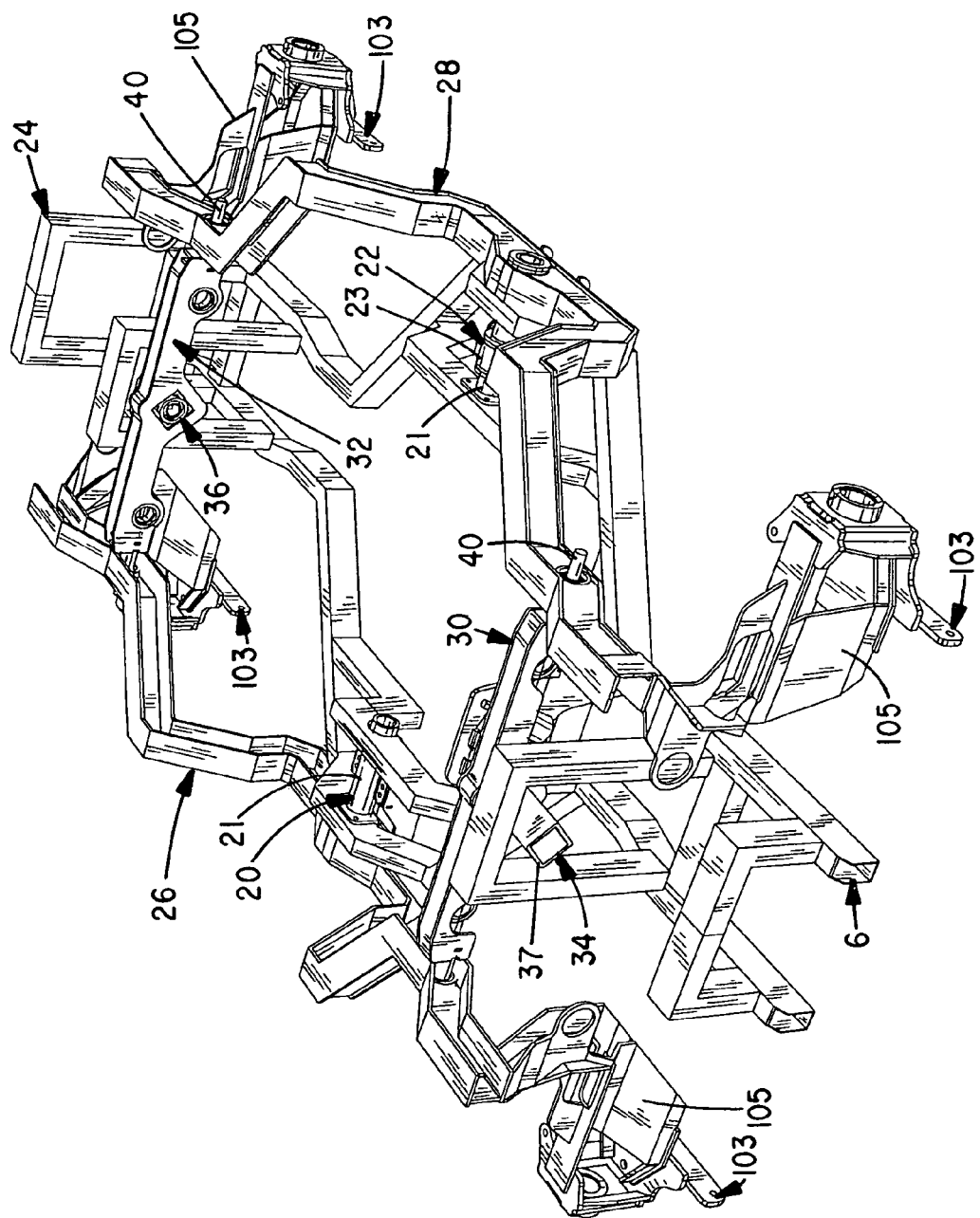
FIG. 5 is a perspective drawing showing the framework of the multi-pivot suspension of the invention.
Figure 6:
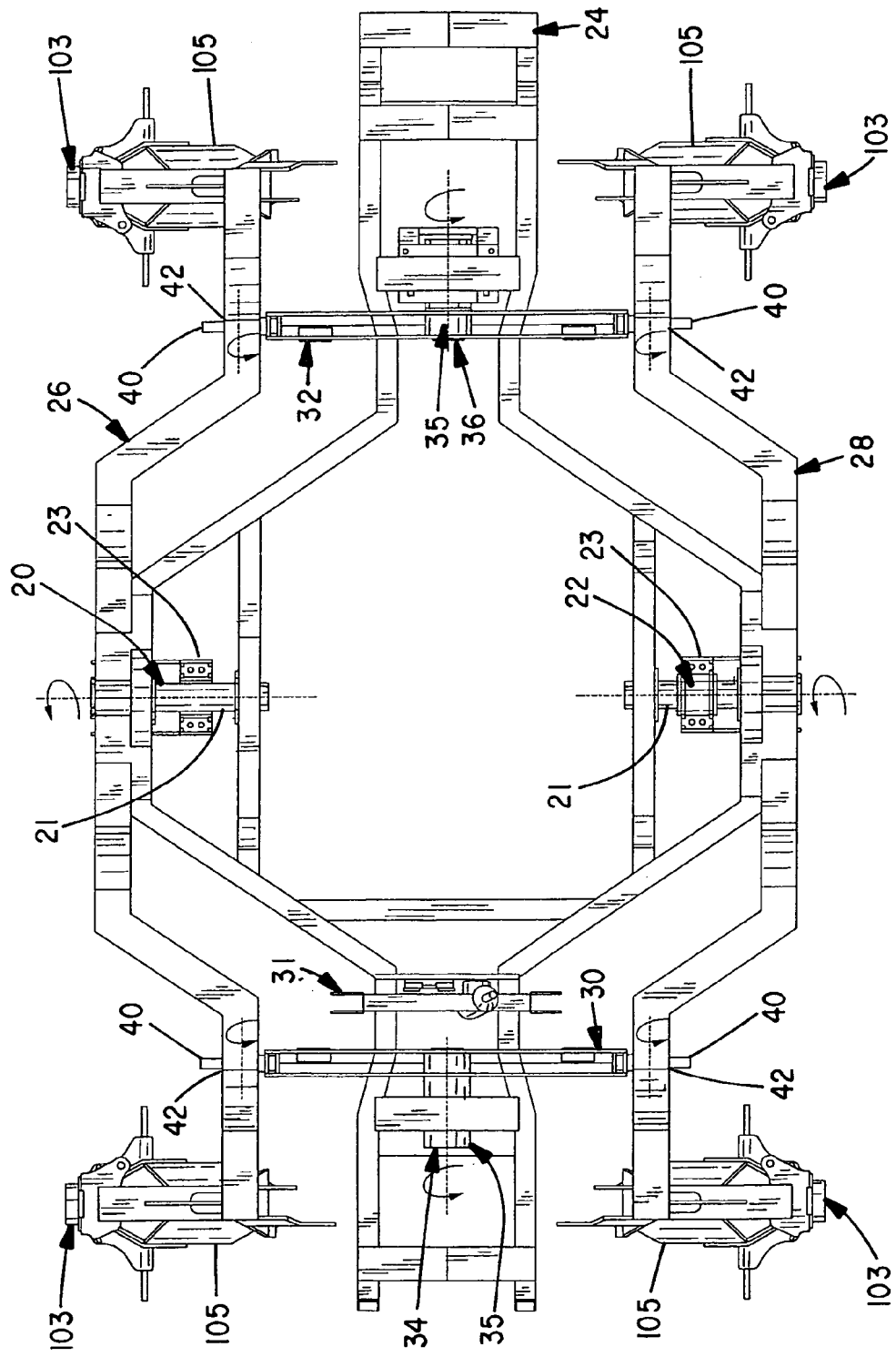
FIG. 6 is a top view of the framework of the multi-pivot suspension of the invention.
Figure 7:
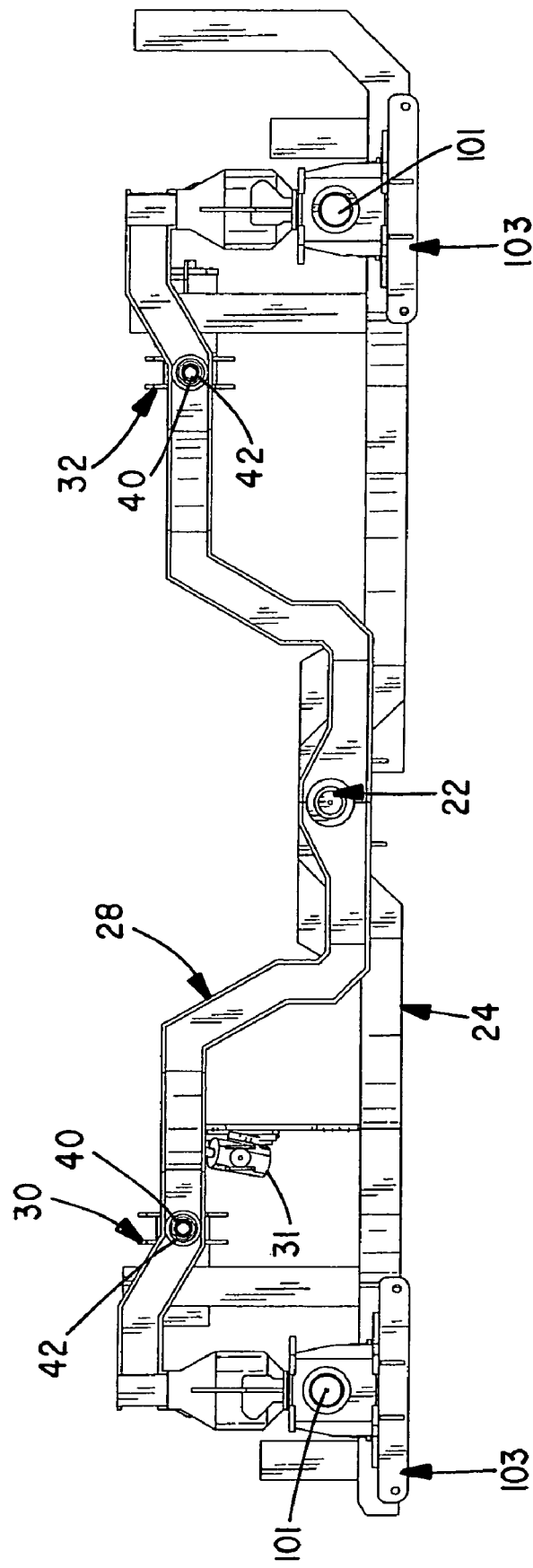
FIG. 7 is a side view of the framework of the multi-pivot suspension of the invention.
Figure 8:
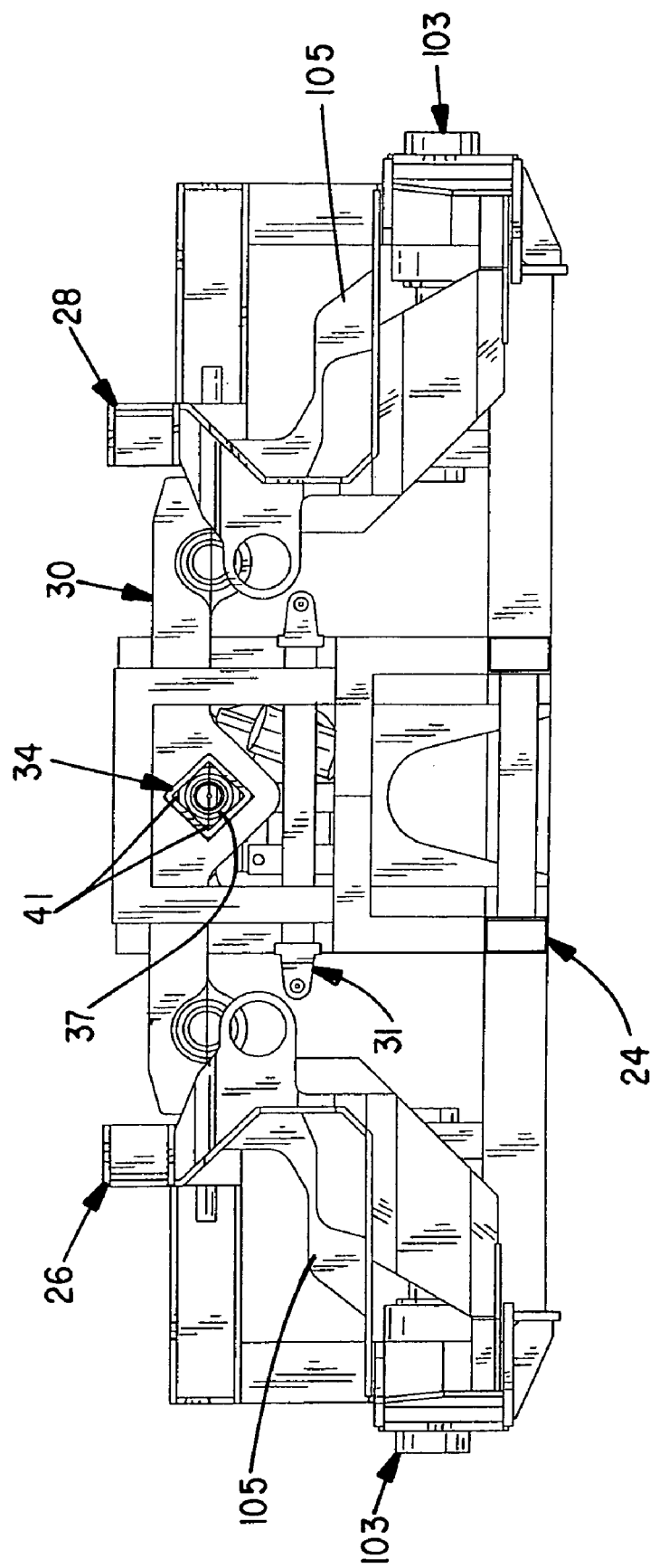
FIG. 8 is a front end view of the framework of the multi-pivot suspension of the invention.
Figure 9:
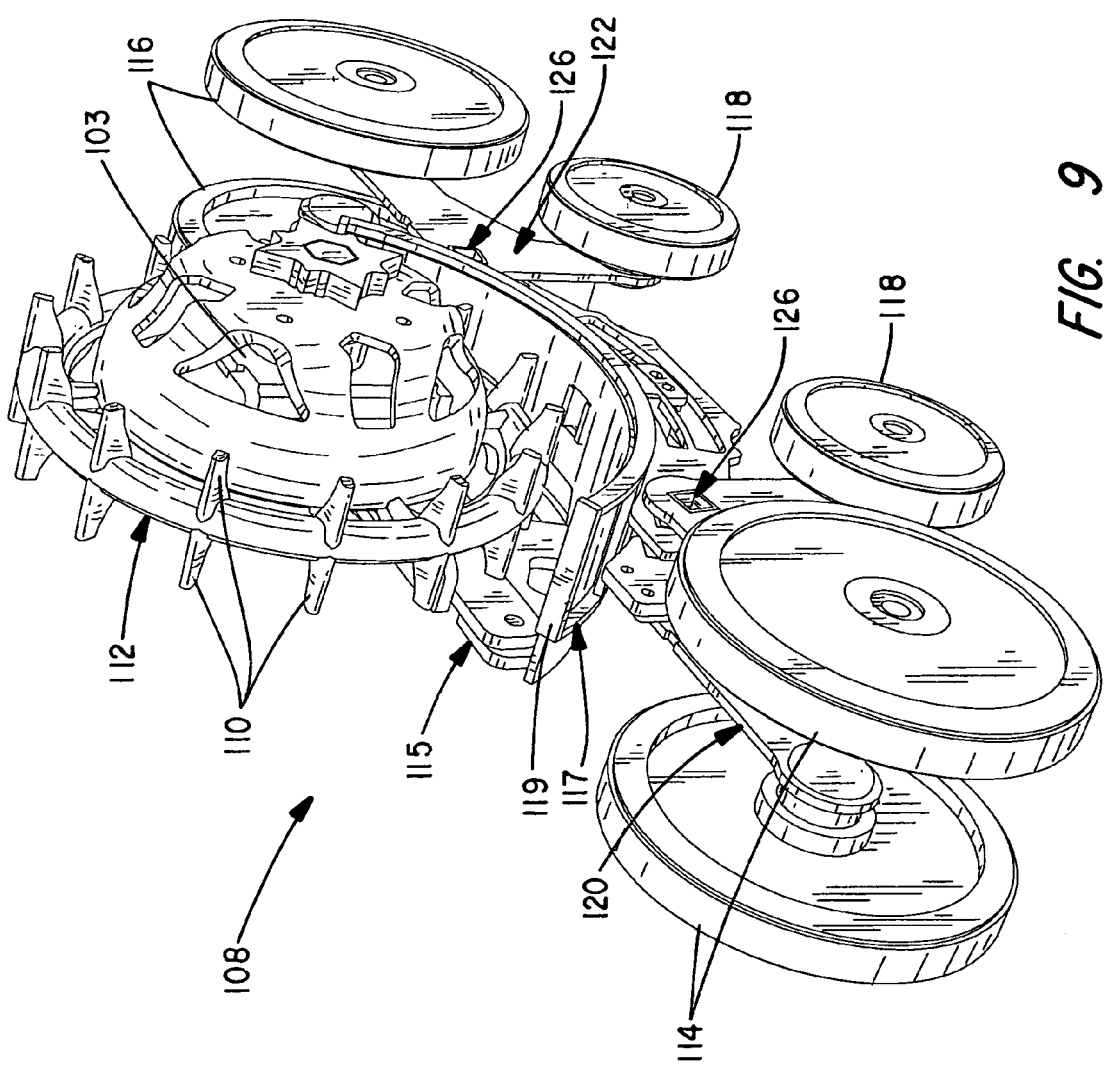
FIG. 9 is a perspective drawing showing the framework of one of the attached track assemblies without the drive belt.
Figure 10:
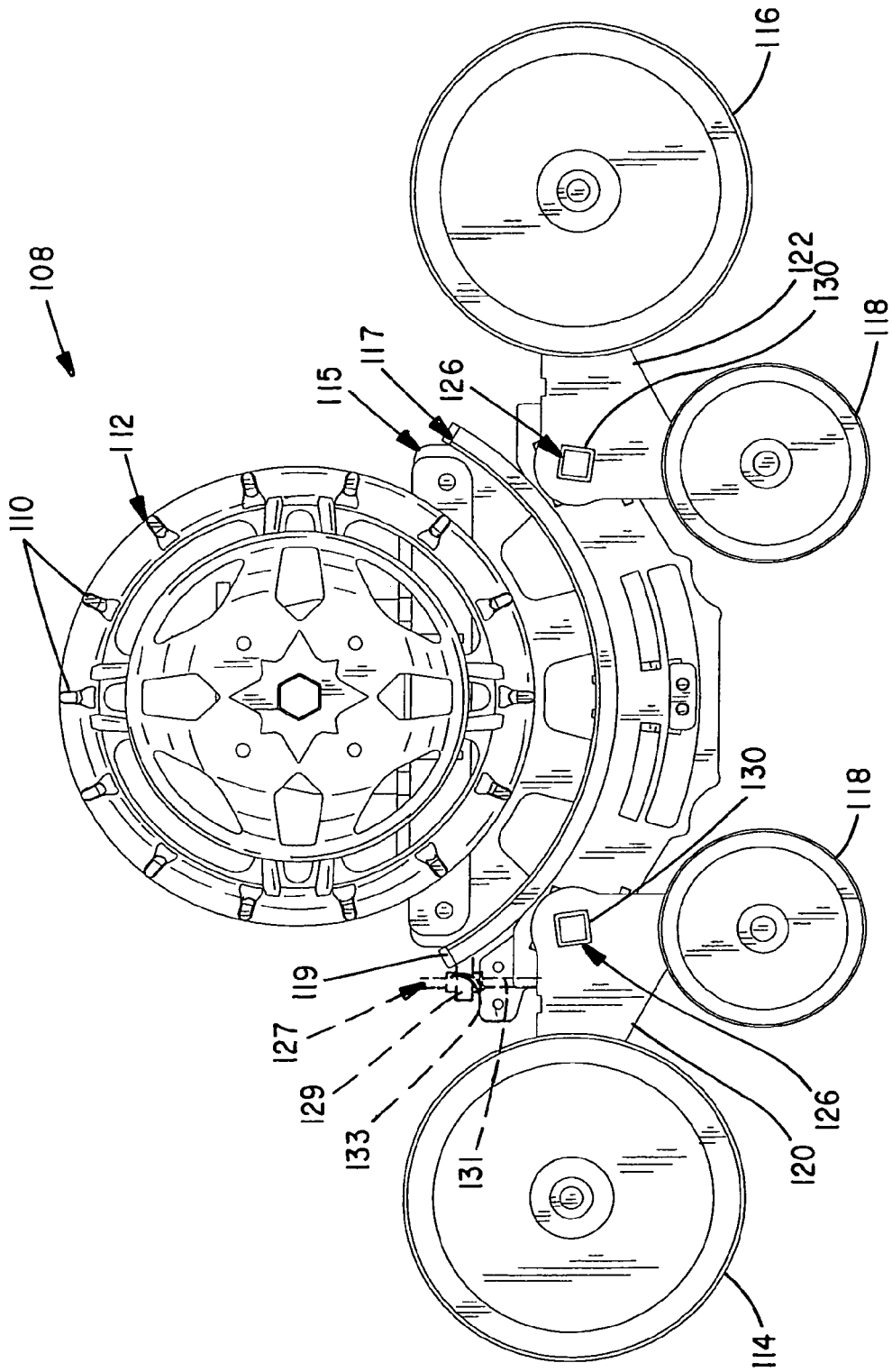
FIG. 10 is a side plan view showing the framework of one of the attached track assemblies without the drive belt looking toward the vehicle.
Figure 11:
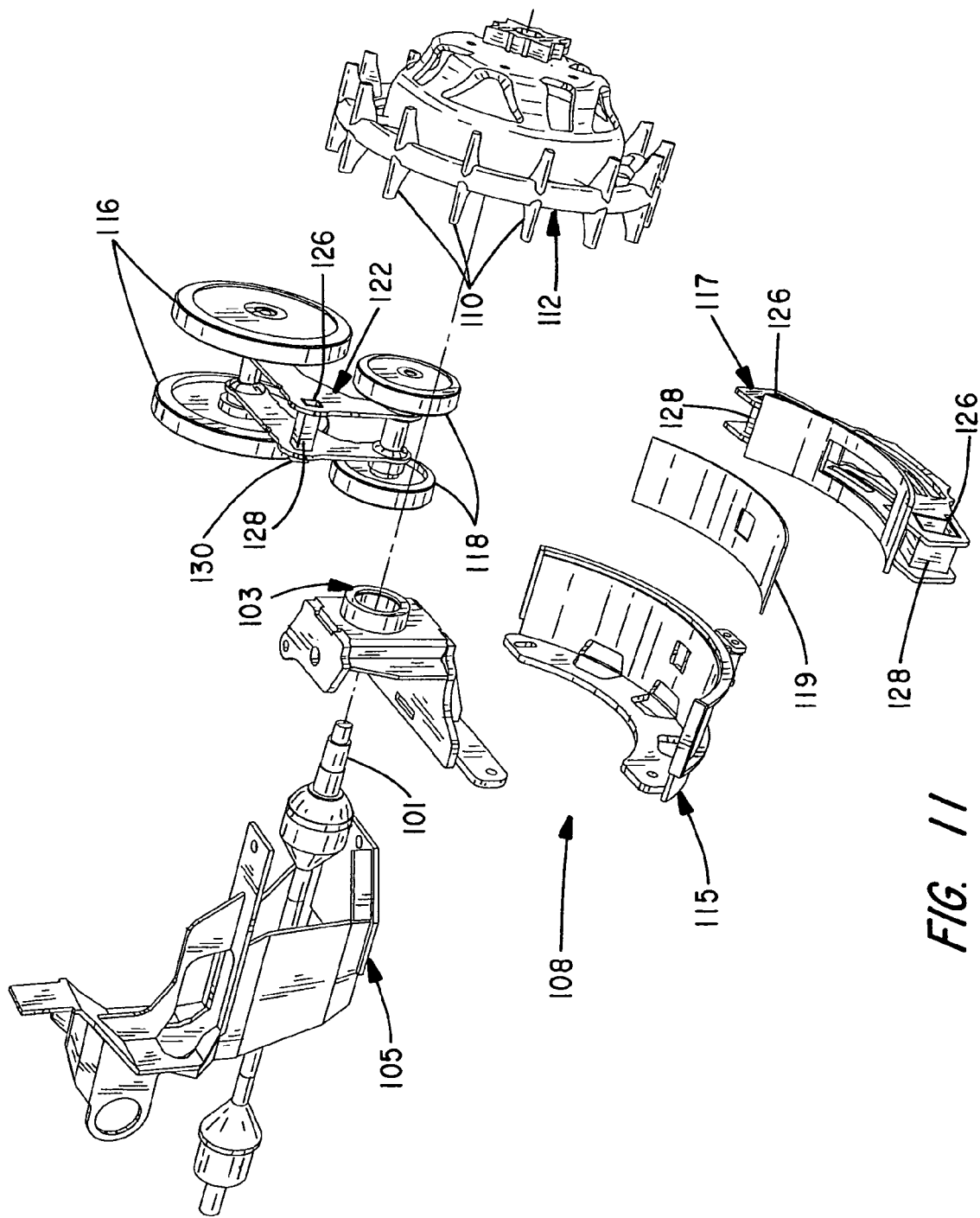
FIG. 11 is a perspective drawing showing an exploded assembly of a portion of the multi-pivot suspension and the framework of an attached track assembly.

Referring to FIG. 1, a perspective view is shown to an all terrain vehicle (ATV) 2 having a chassis 4 constructed of a multi-pivot suspension frame 6 and supported by several track assemblies 8. A suitable operator and passenger compartment or body 10 is supported by the chassis 4. The track assemblies 8 allow the vehicle 2 to traverse wide ranging types of terrain and ground conditions, including streams, mud, rocky terrain, timbered terrain, sand, and snow and ice covered terrain.

Particular details to the construction of the suspension frame 6 are shown at FIGS. 2 through 8. Details to the construction and relative movements of the internal suspensions of the track assemblies 8 are shown at FIGS. 9 through 13 and schematic illustrations to the steering capabilities of the track assemblies are shown at FIGS. 14 through 17. Improvements to the track drive lugs, an alternative torsion biased track assembly, and alternative multi-pivot point suspensions are depicted at FIGS. 18 through 24 and all of which are discussed in further detail below.

The depicted chassis 4 supports an operator and passenger compartment or body 10, surrounding roll cage 12 and gear storage compartment 14. The compartment 10 is depicted as open to the elements but can include coverings and windows to protect the occupant from the elements. The chassis 4 is constructed using conventional techniques and materials and can be configured to any suitable form that accommodates the typical terrain over which the vehicle 2 is intended to travel. The frame members can be constructed as cast pieces and/or be formed and/or welded from flat or tube stock materials. The gear storage compartment 14 can similarly be configured of any suitable materials to any suitable form to handle anticipated contents. A winch, hooks, auxiliary attachments and a variety of other accessory devices can be adapted to the vehicle 2 to facilitate normally anticipated usage.

The chassis 4 includes a multi-pivot frame suspension 6 and framework 18. The depicted framework 18 provides eight pivot points. Details to the pivot locations are shown at FIGS. 2 through 8. The framework 18 provides left and right pivots 20 and 22 at associated transverse axles 21 that are supported by pillow blocks 23 and extend between a central stationary frame assembly 24 and left and right lateral frame sections 26 and 28. Other supporting bushings, bearings and axle retainers are provided at the center frame 24 and frame sections 26 and 28 and which are partially exposed at FIG. 6. The pivots 20 and 22 permit the left and right lateral frame sections 26 and 28 to scissors up and down longitudinally relative to the center frame 24.

Forward and aft transverse cross members 30 and 32 are secured to the center frame 24 at forward and aft torsion biased pivot points 34 and 36. Torsion couplers 35 comprised of an axle 37, concentric collar 39 and intervening flexibly resilient shim members 41 bias the pivots 34 and 36. The couplers 35 particularly provide a controlled resistance to clockwise and counter clockwise rotation of the pivot axle 37 and bias the axle 37 to an equilibrium condition.

The cross members 30 and 32 and pivots 34 and 36 permit the cross members 30 and 32 to pivot laterally relative to the center frame 24. Mounted adjacent the cross member 30 is a steering assembly 31. Associated steering linkage arms (not shown) normally extend from the steering assembly 31 to direct the track assemblies 8 in several possible alternative steering conditions shown at FIGS. 14 through 17.

FIGS. 14, 15, 16 and 17, particularly depict alternative steering conditions that can be established at the track assemblies 8 via the steering assembly 31. Illustrative top plan views are respectively shown to a "front steer" condition, a "rear steer" condition, a "crab steer" condition, and a "360° steer" condition of the independent drive track assemblies 8. The various steering conditions are established independent of the terrain conforming actions of the suspension frame 6 and track suspension 108 and collectively permit the vehicle to traverse a path of least resistance to the encountered terrain.

Stub axles 40 separately protrude from the ends of the cross members 30 and 32 and mate with left and right forward spherical pivot couplers 42 and left and right aft spherical couplers 42 mounted to the left and right lateral frame sections 26 and 28. The spherical pivot couplers 42 independently accommodate flexible motion of the lateral frames 26 and 28 adjacent the four lower lying track assemblies 8.

The cross members 30 and 32 and associated pivots 34, 36 and 42 permit the fore and aft quadrants of the suspension framework 18 to rise and fall independent of the separate suspensions provided at each track assembly 8. Collectively, the transverse pivot joints 20 and 22, transverse cross member pivot joints 34 and 36, and left and right longitudinal spherical pivot joints 42 control and restrain movement of the operator and passenger compartment 10 to ride substantially parallel to the ground and without undue jostling, independent of the terrain conditions.

Figure 23:
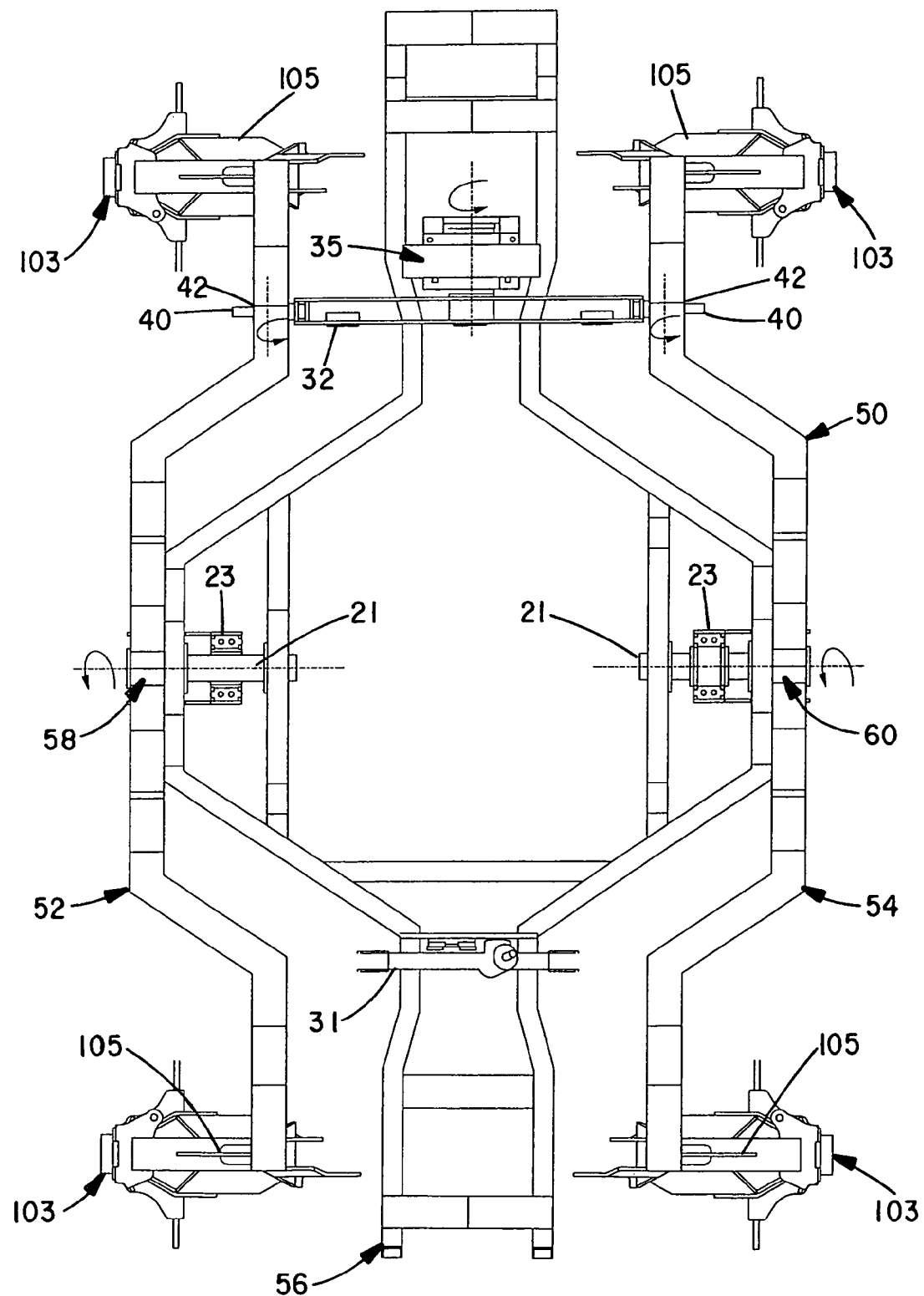
FIG. 23 is a top plan view showing an alternative multi-pivot suspension of the invention that provides five pivot points are provided between a longitudinal center frame, right and left lateral frame sections and an aft cross member.

More or less pivot points can be adapted to the frame suspension 6 and framework 18 to accommodate individual vehicle performance parameters. For example, FIG. 23 depicts an illustrative schematic to a multi-pivot frame suspension 50 wherein five pivot points are provided. Left and right longitudinal frame sections 52 and 54 are mounted to a center frame assembly 56 and axle type pivot assemblies 58 and 60. An aft lateral cross member 32 is supported to a torsion coupler 35 mounted to the center stationary frame 56 to permit the aft ends of the longitudinal frame sections 52 and 54 to pivot laterally under resistance and biased to an equilibrium condition. Stub axles 40 extending from the cross member 32 mount in spherical couplers 42 at the longitudinal frame sections 52 and 54 to provide two additional pivot points at the aft ends of the longitudinal frame sections 52 and 54.

Figure 24:
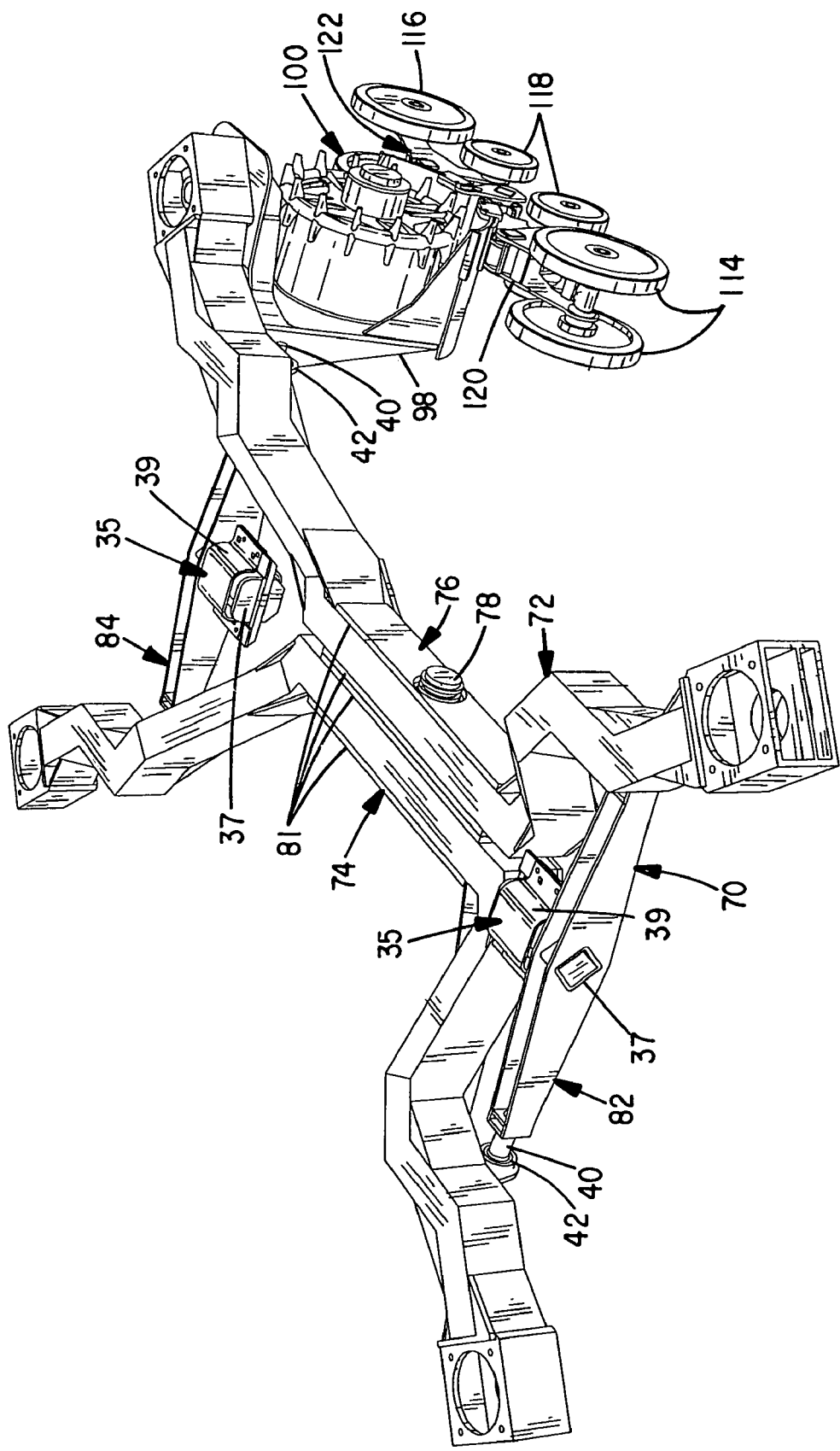
FIG. 24 is a perspective showing an alternative multi-pivot suspension of the invention that provides eight pivot points in relation to left and right longitudinal frame sections which couple together relative to a longitudinal axis at transverse center axles and laterally and fore and aft cross members supported from the chassis via torsion biased pivot couplers, and to the ends of the left and right frame sections and cross members at spherical couplers, along with a representative drive track assembly and electric hub drive motor.

Yet another eight pivot frame suspension 70 is shown at FIG. 24. The suspension 70 provides a framework 72 having adjoining longitudinal frame sections 74 and 76. The longitudinal frame sections 74 and 76 pivot independently relative to each other at one or two transverse pivot axles 78 that rotate within supporting bushing and bearing assemblies fitted to the frame sections 74 and 76 and adjacent support brackets 81 and which brackets 81 mount to the vehicle body 10. Fore and aft lateral cross frame members 82 and 84 independently rotate at torsion couplers 35 that are coupled to the operator and passenger compartment (not shown). Stub axles 40 extend from the lateral cross members 82 and 84 and mount in forward and aft spherical pivot couplers 42 adjacent depending brackets 98 secured to the distal ends of the left and right longitudinal frame sections 74 and 76. An electrically driven drive sprocket assembly 100 is secured to each bracket 98 and only one of which is shown.

The total number and location of each pivot assembly and type of pivot coupling for any particular vehicle 2 is determined and defined to enhance the performance of the vehicle 2. Preferably, the pivot action at the associated multi-pivot frame suspension enhances or augments the flexibility of the suspensions at the wheel or track assemblies 8 and 100. The combined and independent effects of each multi-pivot frame suspension 6, 50 or 70 taken with the associated wheel and/or track suspensions 8 allow the vehicle 2 to comfortably traverse obstructions as the vehicle 2 maneuvers over the terrain for which it is designed without undue movement of occupants or gear riding in the operator, passenger and/or storage compartments.

Returning attention to FIGS. 2 through 8, suitably geared front and rear drives 97 and 99 are mounted to the center frame 24. Conventional drive axle shafts 101 extend from the drives 97 and 99 and mount to each track assembly 8. The axle shafts 101 are supported to bearing bracket assemblies 103 from support brackets 105 that depend from the left and right frame sections 26 and 28 and couple to drive frameworks 108 of the track assemblies 8.

The track assemblies 8 collectively support the four corners of the frame suspension 6. Although the vehicle 2 is constructed with four track assemblies 8, any combination of track assemblies 8 or another type track assembly and appropriate wheel assemblies can be included as appropriate. Each track assembly 8 provides an endless track 102 of suitable construction to support the vehicle 2 over the anticipated terrain. Lugged surfaces of appropriate shape, size and pattern configuration(s) project from the external and internal surfaces of the track 102. The ground engaging lugs that normally appear on the external surface of the track 102 are not shown for convenience.

FIGS. 18 through 21 however separately depict improved drive lugs 104 and 106 that cooperate with a track drive assembly 108. The interior lugs 104 particularly cooperate with sprocket teeth 110 that transversely project from a drive sprocket 112 to rotate the track 102. Contemporaneously, the lugs 104 and 106 confine the movement of the sets of idler wheels 114, 116 and 118 to longitudinal channels 111. The fore and aft idler wheels 114 and 116 exhibit diameters on the order of 10 to 16 inches. The intermediate idler wheels 118 exhibit diameters on the order of 8 to 10 inches.

On occasion the wheels 114, 116 and 118 derailed due to contact with the vertical corner edges of the lugs 104 and 106 facing the channels 11 and in spite of radiused or tapered track contact surfaces at the wheels 114, 116 and 118. The drive lugs 104 and 106 have therefore been improved to resist derailment by relieving or chamfering the corner edge surfaces 113 of the lugs 104 and 106 facing the channels 11. When the idler wheels 114, 116 and 118 now attempt to rise along the improved lugs 104 and 106, the chamfered surfaces 113 relieve the contact pressure and cause the idler wheels 114, 116 and 118 to fall back into contact with the track 102 and thereby prevent derailment.

The tracks 102 are typically molded from rubber with appropriate layers of reinforcing fibers, longitudinal and transverse belting, reinforcing members, stiffeners and other devices to facilitate track movement, clear debris, prevent dislodgment, control track operating temperature and/or reduce track wear and optimize track performance. The tracks 102 are trained under tension around the drive sprocket 112 and idler wheels 114, 116 and 118. Tension is established by a reciprocating tensioner (not shown) at each drive frame 108 that stretches and relaxes the track 102 relative to the track drive frame 108.

With attention to FIGS. 2 and 9-11, the drive sprocket 112 of each track assembly 8 is supported from one of the axle shafts 101 that extends through one of the bearing assemblies 103 and attach to the drive sprocket 112. Each drive sprocket 112 rotates adjacent to an upper, arcuate bearing support 115 that attaches to the bearing assembly 103. A lower arcuate bearing support 117 and intermediate bearing plate 119 are secured to pivot about the upper bearing support 115. The cooperating bearing supports 115 and 117 permit the track assemblies 8 to pivot about the axle shafts 101. The configuration of the bearing supports 115 and 117 and plate 119 can be varied as desired.

The lower bearing support 117 separately supports several paired sets of the idler wheels 114 and 118 and 116 and 118 from fore and aft rocker arms 120 and 122. The rocker arms 120 and 122 mount to the lower bearing support 117 at torsion couplers 126. The couplers 126 each provide a collar 128 that supports an axle 130 at the rocker arm 120 or 122 between several elastomer shim members 41 disposed between the interior of the collar 128 and the concentric axle 130. The shims 41 are selected to exhibit durometers sufficient to withstand the anticipated forces. The shims 41 resiliently restrain and resist clockwise and counterclockwise rotation of the axles 130 and bias the idler wheel sets 114, 118 and 116, 118 to equilibrium positions.

In lieu of the foregoing concentric torsion assemblies 126, a linear torsion coupler assembly 127 (shown in dashed line) can be provided. The linear torsion assembly 127 might include a bracket 129 secured to a lower bearing support 117 and a linkage rod 131 that couples to an associated rocker arm 120 or 122. Elastomer members 133 (e.g. bushings) mounted to the rod 131 and located on one or both sides of the bearing bracket 129 can thereby similarly restrain and bias rotation of the rocker arms 120 and 122.

Figure 12:
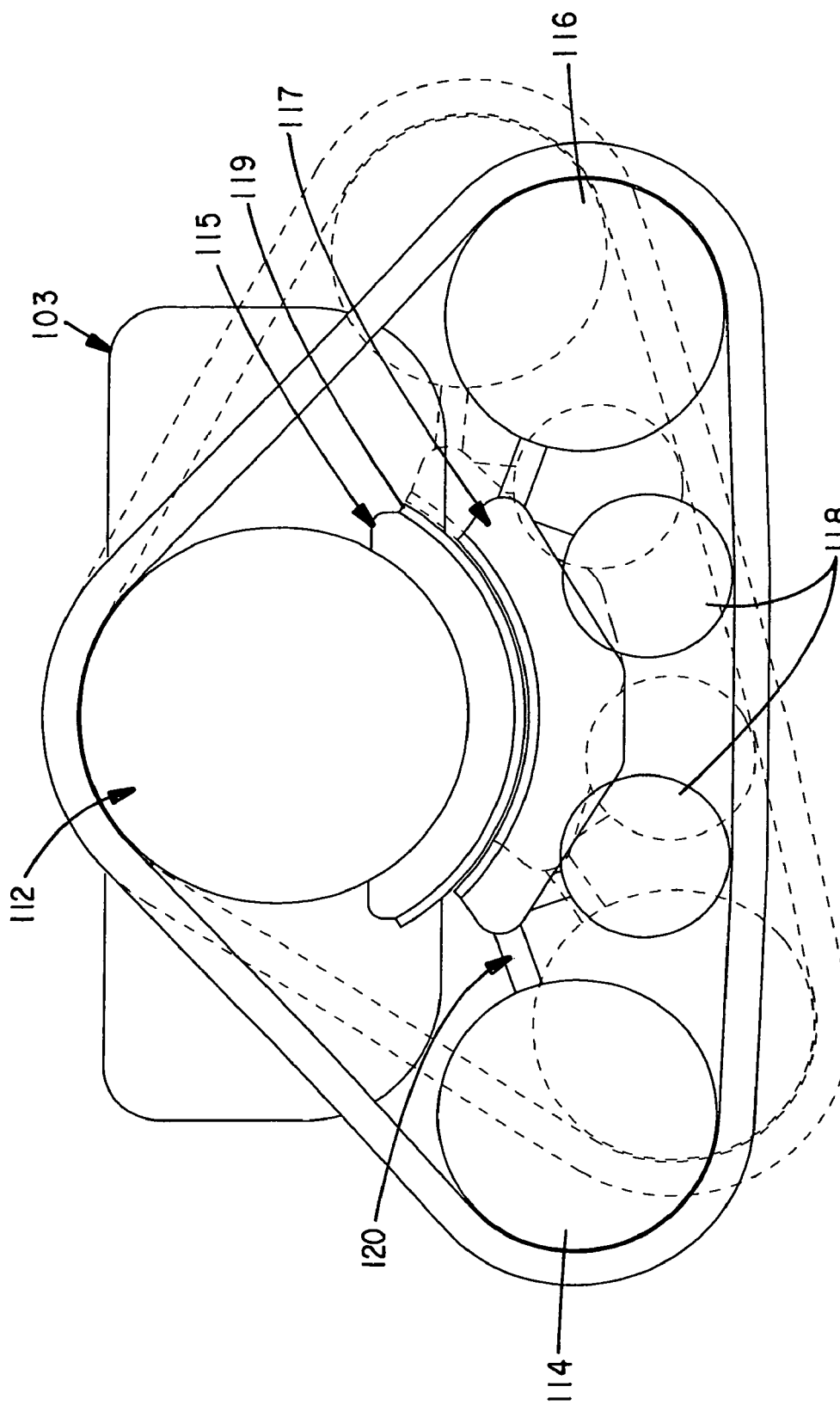
FIG. 12 is an illustrative plan view depicting several conditions of relative pivotal movement of the reciprocating slide plate supports in response to encountered obstructions.
Figure 13:
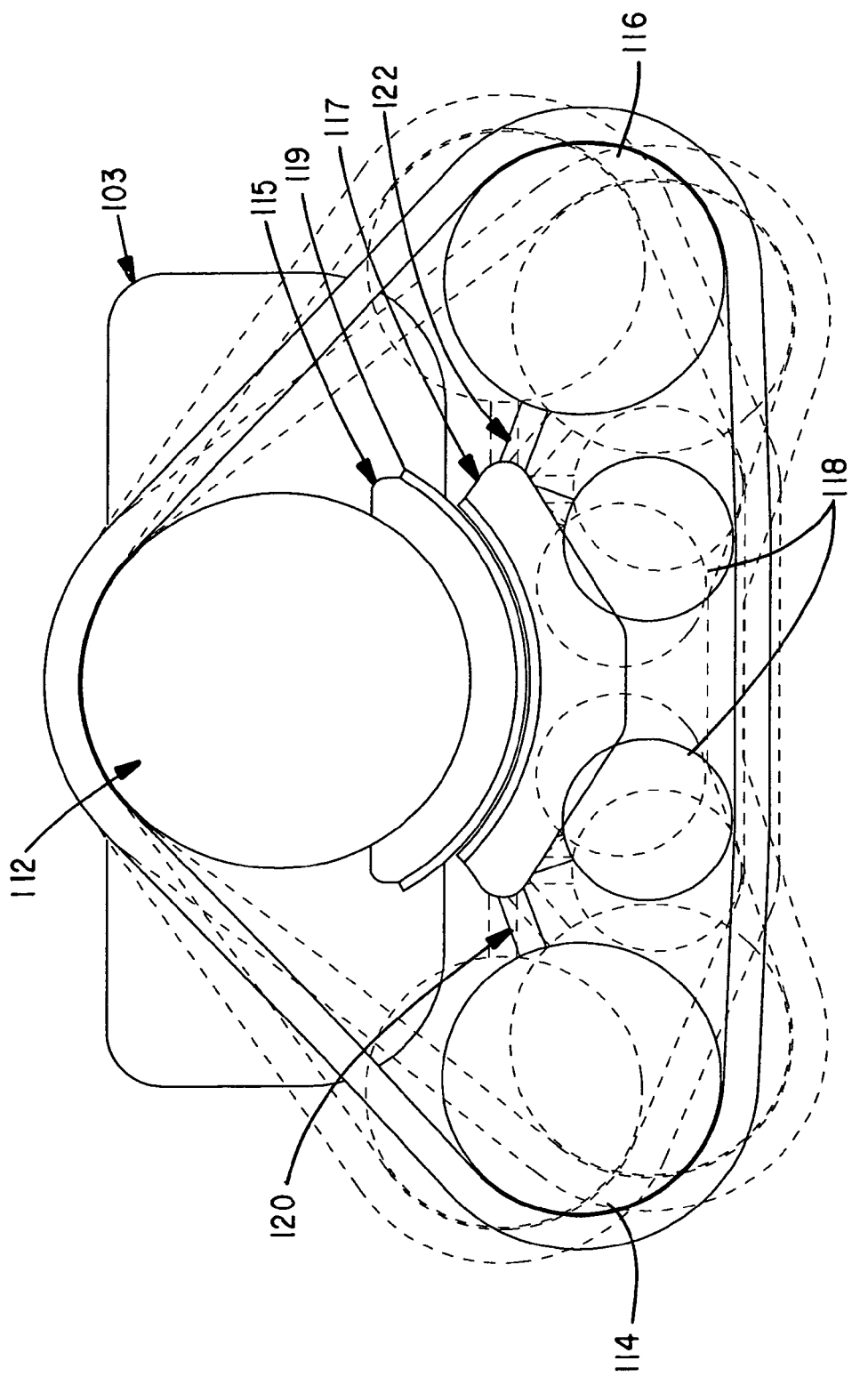
FIG. 13 is an illustrative plan view depicting several conditions of the independent fore and aft conformal movement of the drive track and idler wheel supports relative to the reciprocating slide plate supports in response to encountered obstructions.
Figure 14:
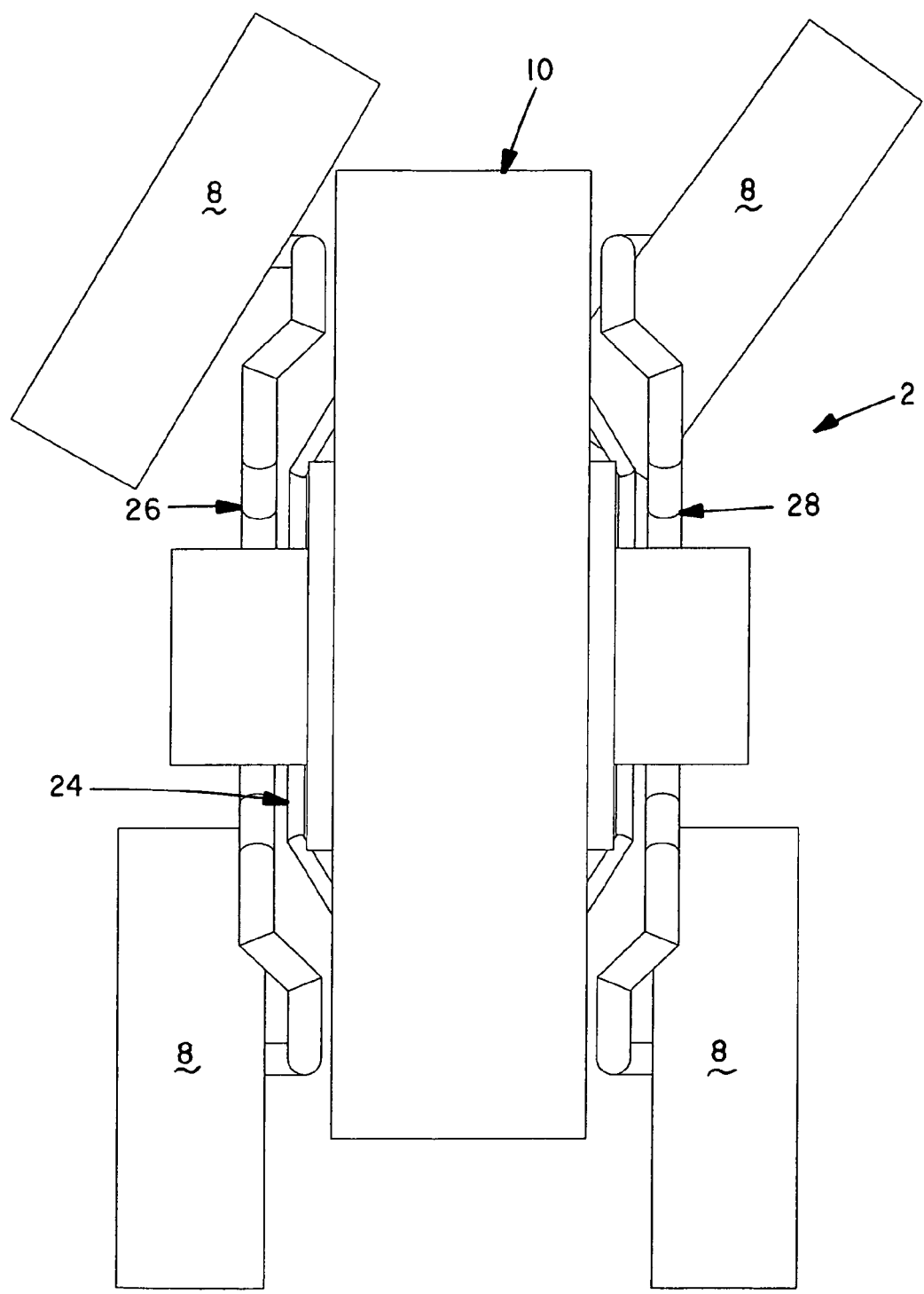
FIG. 14 is a top plan illustrative schematic view depicting a "front steer" condition of independent drive track assemblies.
Figure 15:
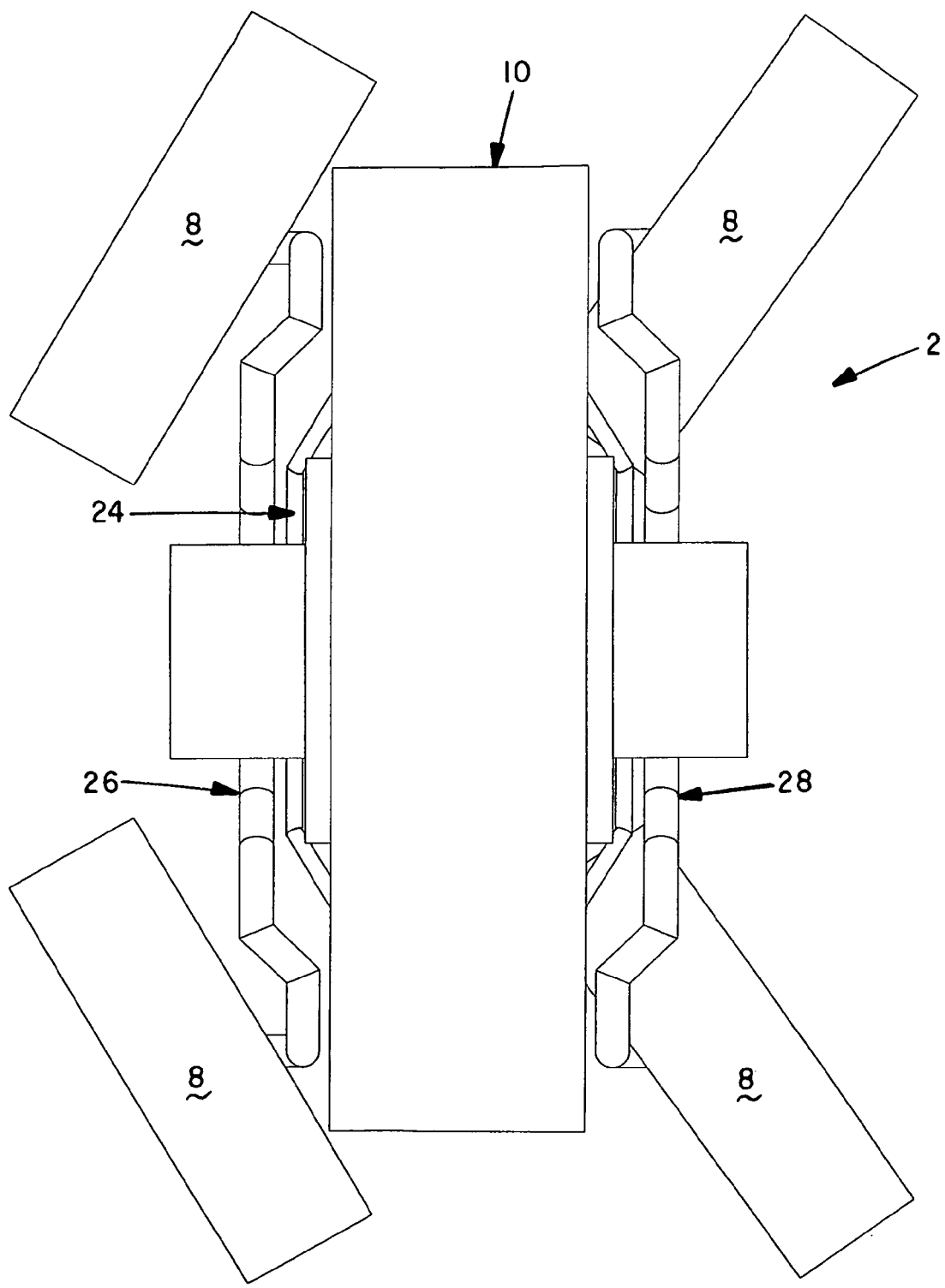
FIG. 15 is a top plan illustrative schematic view depicting a "rear steer" condition of independent drive track assemblies.
Figure 16:
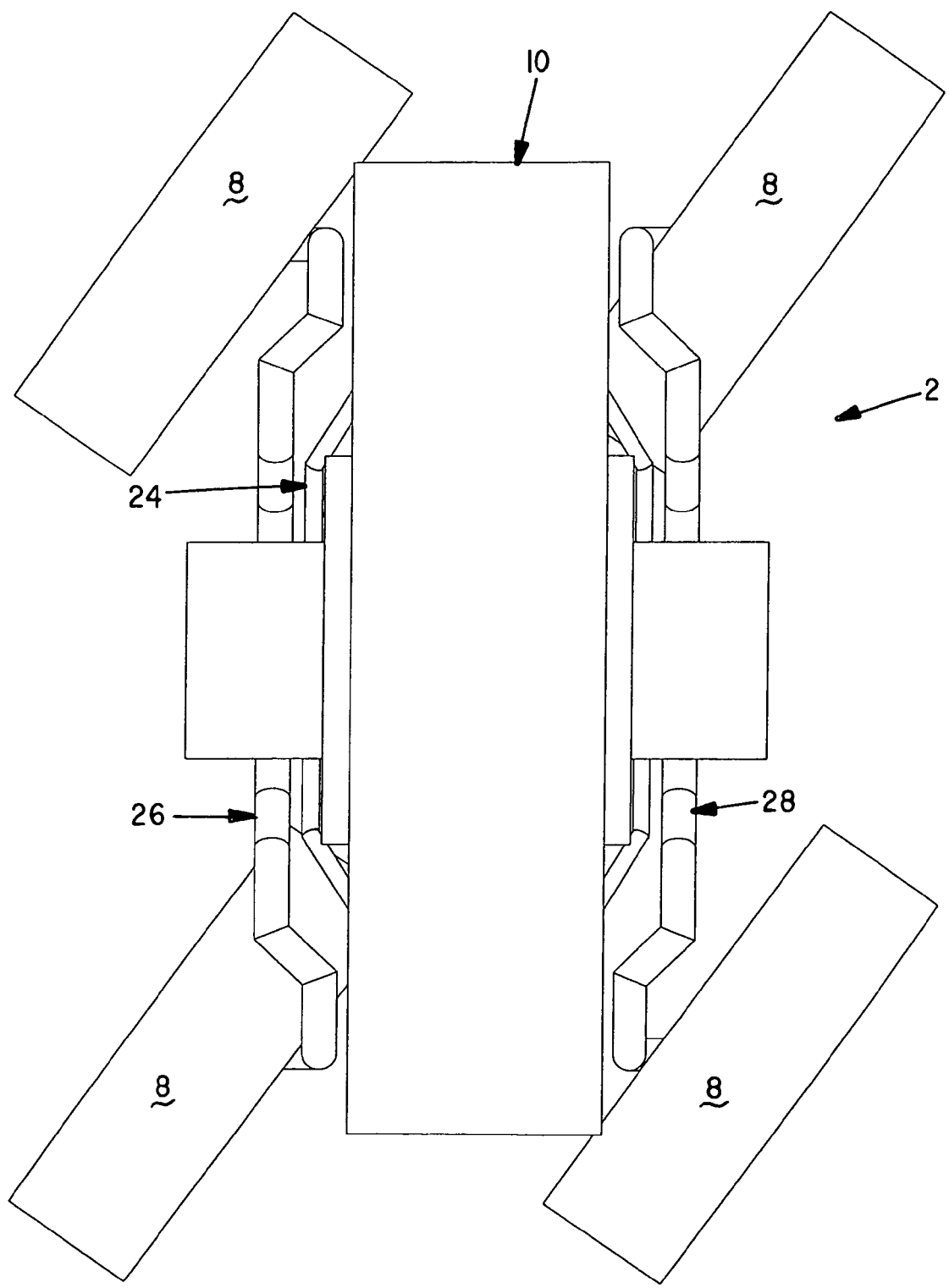
FIG. 16 is a top plan illustrative schematic view depicting a "crab steer" condition of independent drive track assemblies.
Figure 17:
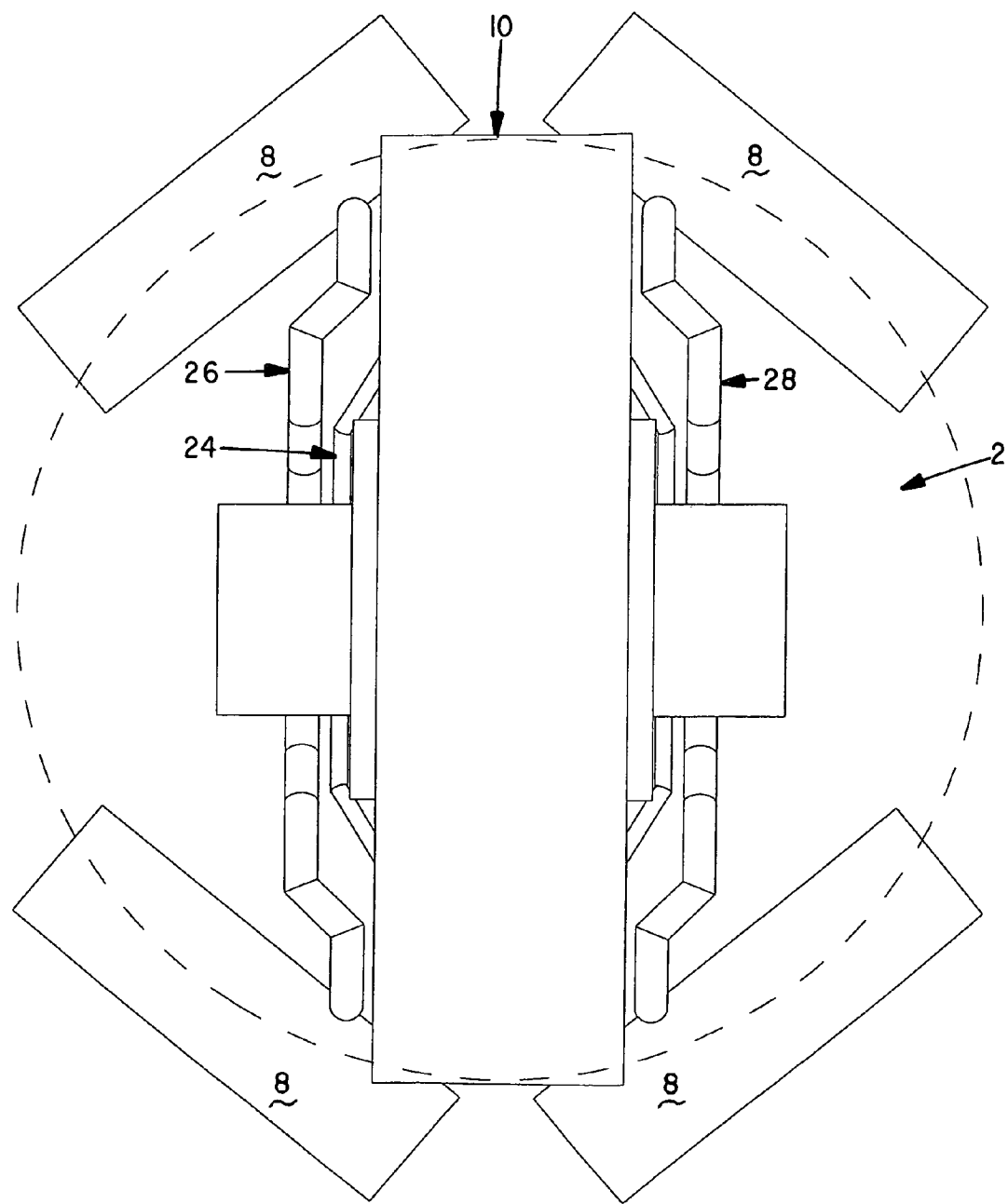
FIG. 17 is a top plan illustrative schematic view depicting a "360° steer" condition of independent drive track assemblies.
Figure 18:
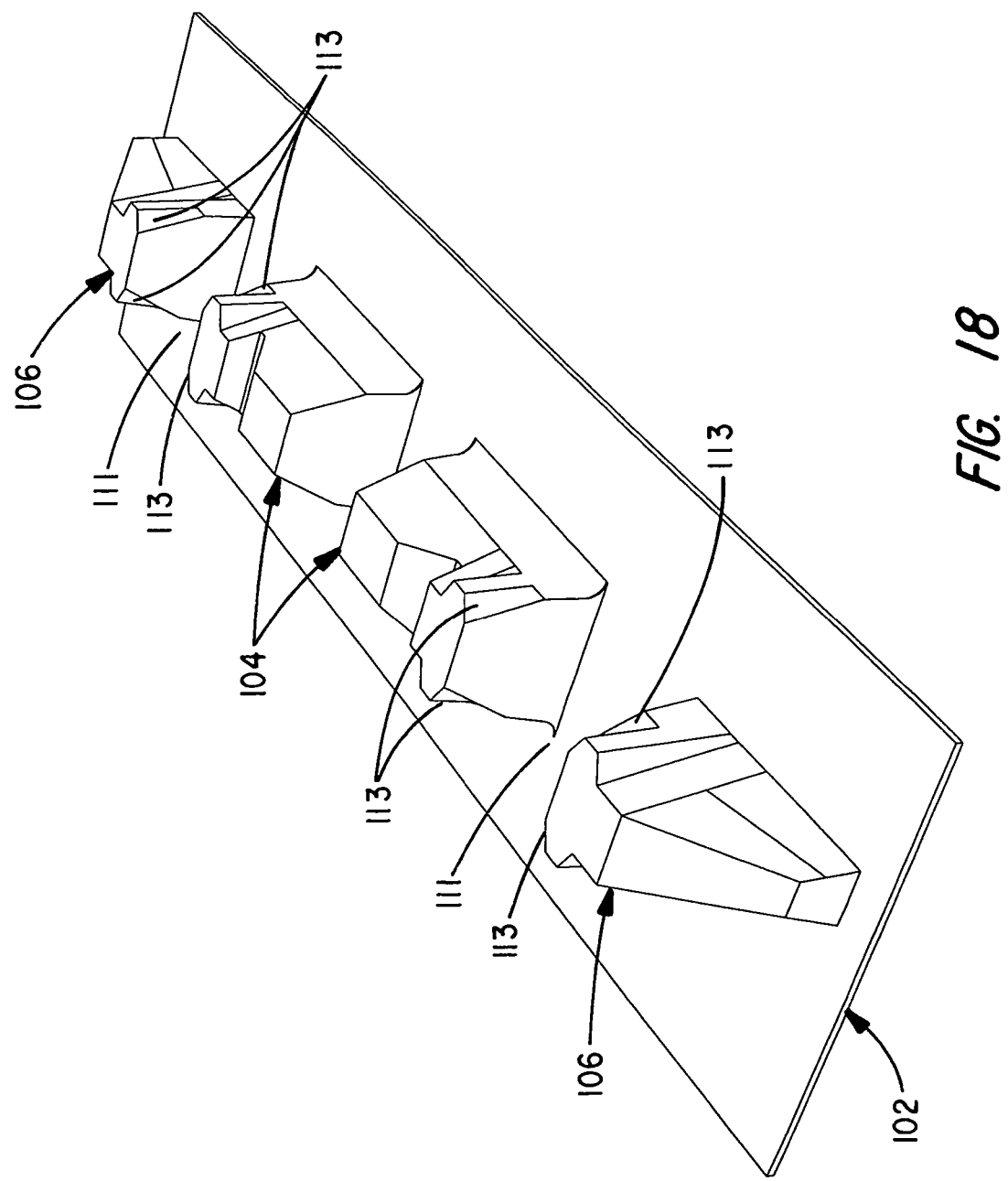
FIG. 18 is a perspective drawing showing an improved internal drive lug surface of the track wherein lug surfaces are shaped to minimize track derailment.
Figure 19:
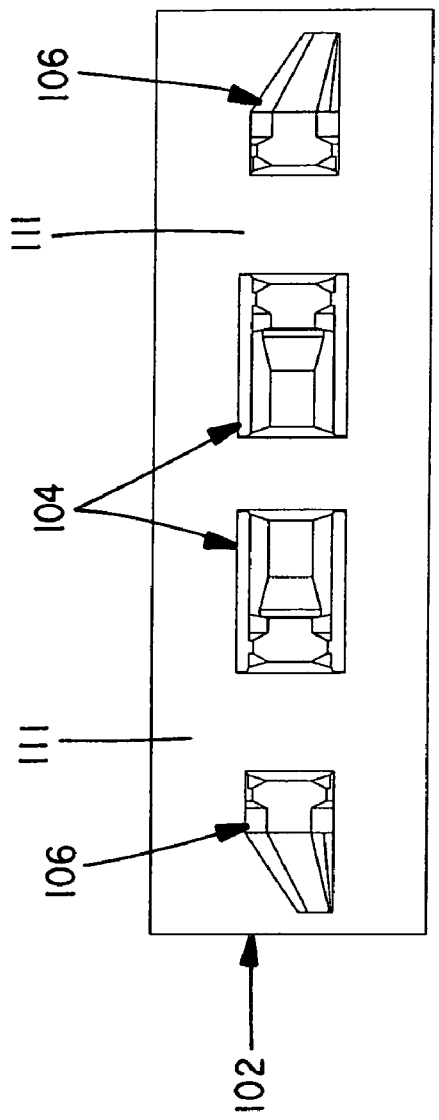
FIG. 19 is a top plan view of the track surface of FIG. 19.
Figure 20:
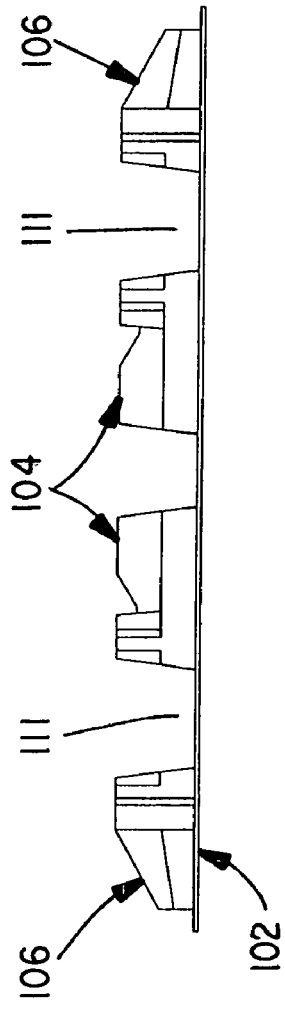
FIG. 20 is a longitudinal side plan view of the track surface of FIG. 19.
Figure 21:
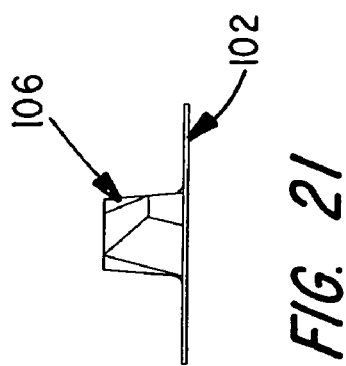
FIG. 21 is an end plan view of the track surface of FIG. 19.

As each track 102 encounters obstructions, the track assemblies 8 rise and fall and pivot. The idler wheel sets 114 and 118 and 116 and 118 contemporaneously rise and fall and pivot via the rocker arms 120 and 122 to vary the contour of the track 102. FIG. 12 depicts several alternative conditions of a track assembly 8 as it pivots about a support axle 101. FIG. 13 separately depicts the independent interaction of the rocker arms 120 and 122 with the idler wheel sets 114, 118 and 116, 118 and induced flexion of the track 102 to conform to encountered obstructions. The rotation of the rocker arms 120 and 122 is transferred via the axles 130 to the torsion couplers 126 which contemporaneously resist and bias the track 102 to an equilibrium condition. A controlled conformal contact is thus maintained via the contemporaneous movement of the frame suspension 6 and the track suspension 108 with the terrain.

Figure 22:
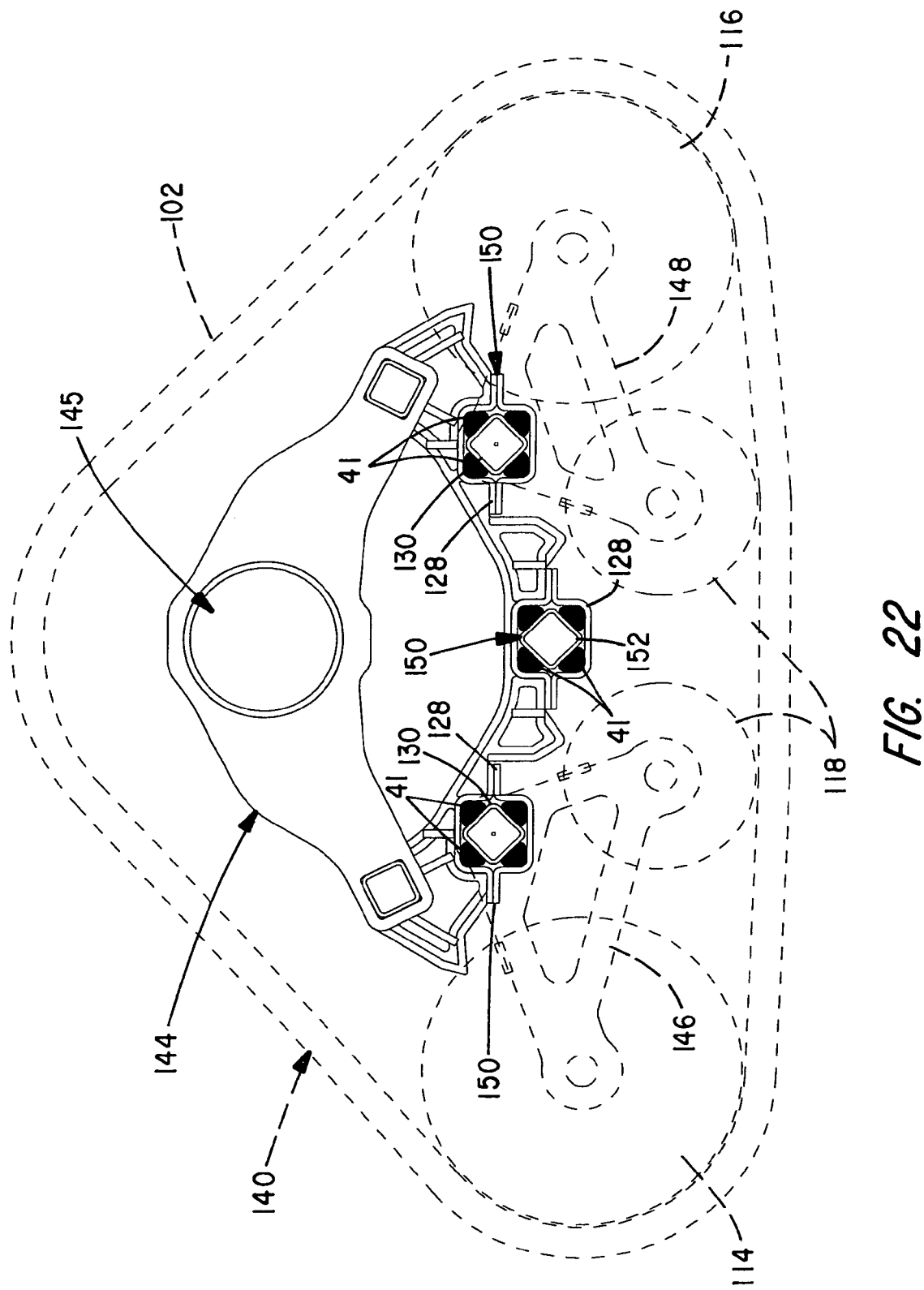
FIG. 22 is a side view of an alternative track assembly framework wherein rocker arms and frame sections are supported from three independent torsion couplers.

FIG. 22 lastly depicts an alternative track assembly 140 that could be mounted to any of the multi-pivot suspension frames 6, 50 or 70 or still another type suspension frame. In lieu of pivoting supports 115 and 117, the track assembly 140 provides a primary frame section 144 that mounts to an axle shaft 101 (not shown) in the region of an eccentric tensioner 146. Idler wheel sets 114, 118 and 116, 118 are supported to the frame 144 at yokes 146 and 148. The yokes 146 and 148 are coupled to torsion couplers 150. Resilient members 41 restrain and bias rotation of the yokes 146 and 148 to control the flexion of the track 102 in a fashion similar to that shown at FIG. 13.

Rotation and pivoting of the track assembly 140 relative to the vehicle's suspension frame is limited by a further torsion coupler 150 that, for example, cooperates with the suspension frame 6 via a linkage member 152. The linkage member 152 mounts within torsion collar 39 to restrain and direct pivotal movements of the track assembly 140 to an equilibrium position.

While the invention is shown and described with respect to several presently preferred and considered assemblies and several considered improvements, modifications and/or alternatives thereto, still other assemblies and arrangements may be suggested to those skilled in the art. It is to be appreciated therefore that the features of the foregoing multi-pivot suspension frames, track assemblies and tracks and can be arranged in different combinations. For example, the vehicle body can be constructed in different configurations; the suspension frameworks and pivoting beams can be constructed to different shapes; the suspension frameworks can pivot at different locations; the track assemblies can be configured differently; and/or different tracks can be fitted to the track assemblies, among many other different combinations. The foregoing description should therefore be construed to include all those embodiments within the spirit and scope of the following claims.

What is claimed is:

1. A vehicle comprising:
   a) a chassis framework supporting a body and comprising first and second longitudinal frame sections, wherein said first and second longitudinal frame sections extend in substantially parallel relation to each other, wherein said first and second longitudinal frame sections are coupled to said body, wherein a first pivot axle couples said first and second longitudinal frame sections together to permit laterally offset fore and aft ends of said first and second longitudinal frame sections to pivot independent of each other and said body;
   b) a plurality of drive axles mounted to transversely extend from the fore and aft ends of said first and second longitudinal frame sections;
   c) first and second cross frame sections extending between laterally opposed displaced portions of said first and second longitudinal frame sections, wherein a plurality of pivot couplers couple the ends of the first and second cross frame sections to pivot at the coupling points to said first and second longitudinal frame sections, and first and second torsion couplers mounted to said first and second cross frame sections and coupled to said body, and including torsion means for resiliently resisting and torsionally biasing rotation of each of said first and second cross frame sections relative to said body to an equilibrium position; and
   d) a plurality of rotating members coupled to pivot about each of said drive axles to support said chassis framework and body, and including means for resiliently biasing each rotating member to an equilibrium position relative to said first and second longitudinal frame sections, whereby each rotating member is able to resiliently pivot relative to the first and second longitudinal frame sections and independent of movement of the first and second cross frame sections and the first and second longitudinal frame sections upon encountering changing terrain contours to maintain a horizontal orientation of said body relative to the terrain.

2. A vehicle comprising:
   a) a chassis framework supporting a body and comprising first and second longitudinal frame sections, wherein said first and second longitudinal frame sections extend in substantially parallel relation to each other, wherein said first and second longitudinal frame sections are coupled to said body, wherein a first pivot axle couples said first and second longitudinal frame sections together to permit laterally offset fore and aft ends of said first and second longitudinal frame sections to pivot independent of each other and said body;
   b) a plurality of drive axles mounted to transversely extend from the fore and aft ends of said first and second longitudinal frame sections;
   c) first and second cross frame sections extending between laterally opposed displaced portions of said first and second longitudinal frame sections, wherein a plurality of pivot couplers couple the ends of the first and second cross frame sections to pivot at the coupling points to said first and second longitudinal frame sections, and first and second torsion couplers mounted to said first and second cross frame sections and coupled to said body, and including torsion means for resiliently resisting and torsionally biasing rotation of each of said first and second cross frame sections relative to said body to an equilibrium position; and
   d) a plurality of track assemblies, wherein each track assembly is coupled to pivot about one of said drive axles to support said chassis framework and body, wherein each track assembly includes a drive sprocket, a plurality of idler wheels and a track trained about said sprocket and idler wheels to rotate and direct vehicle movement, and wherein each track assembly is resiliently biased to an equilibrium position relative to said first and second longitudinal frame sections, whereby each track assembly is able to resiliently pivot relative to the first and second longitudinal frame sections and independent of movement of the first and second cross frame sections and the first and second longitudinal frame sections upon encountering changing terrain contours to maintain a horizontal orientation of said body relative to the terrain.

3. A vehicle as set forth in claim 2 wherein at least one of said track assemblies includes first and second yokes pivotally coupled to a track support frame member, wherein each of said first and second yokes are coupled to at least two of said idler wheels, and including yoke biasing means for torsionally biasing said first and second yokes to resist and bias rotation of said first and second yokes to an equilibrium position and such that the contour of said track can change shape to conform to encountered obstacles and as said track assembly pivots from one of said first and second longitudinal frame sections.

4. A vehicle as set forth in claim 2, wherein at least one of the drive sprockets is electrically driven.

5. A vehicle as set forth in claim 2 wherein said first and, second torsion couplers comprise of a plurality of resilient elastomer members mounted to resist and bias rotation of said first and second cross frames and said first and second longitudinal frame sections to an equilibrium position.

6. A vehicle comprising:
   a) a chassis framework supporting a body and comprising first and second longitudinal frame sections, wherein said first and second longitudinal frame sections extend in substantially parallel relation to each other, wherein first and second brackets couple said first and second longitudinal frame sections to said body, wherein a first pivot axle couples said first and second brackets to said first and second longitudinal frame sections to permit laterally offset fore and aft ends of said first and second longitudinal frame sections to pivot independent of each other and said body;
   b) a plurality of drive axles mounted to transversely extend from the fore and aft ends of said first and second longitudinal frame sections;
   c) first and second cross frame sections mounted between displaced fore and aft ends of said first and second longitudinal frame sections, wherein a plurality of pivot couplers couple ends of the first and second cross frame sections to pivot at the fore and aft ends of said first and second longitudinal frame sections, and first and second torsion couplers mounted to said first and second cross frame sections and coupled to said body, and including torsion means for resiliently resisting and torsionally biasing rotation of each of said first and second cross frame sections relative to said body to an equilibrium position; and
   d) a plurality of track assemblies, wherein each track assembly is coupled to pivot about one of said drive axles to support said chassis framework and body, wherein each track assembly includes a drive sprocket, a plurality of idler wheels and a track trained about said sprocket and idler wheels to rotate and direct vehicle movement, and wherein each track assembly is resiliently biased to an equilibrium position relative to said first and second longitudinal frame sections, whereby each track assembly is able to resiliently pivot relative to the first and second longitudinal frame sections and independent of movement of the first and second cross frame sections and the first and second longitudinal frame sections upon encountering changing terrain contours to maintain a horizontal orientation of said body relative to the terrain.

7. A vehicle as set forth in claim 6 wherein at least one of said track assemblies includes first and second yokes pivotally coupled to a track support frame member, wherein each of said first and second yokes are coupled to at least two of said idler wheels, and including yoke biasing means for torsionally biasing said first and second yokes to resist and bias rotation of said first and second yokes to an equilibrium position and such that the contour of said track can change shape to conform to encountered obstacles and as said track assembly pivots from said chassis framework.

* * * * *